US 11,248,077 B2

(12) United States Patent
Kadowaki et al.

(10) Patent No.: US 11,248,077 B2
(45) Date of Patent: Feb. 15, 2022

(54) POLYMERIZABLE COMPOSITION FOR OPTICAL MATERIAL AND MOLDED PRODUCT

(71) Applicant: Mitsui Chemicals, Inc., Tokyo (JP)

(72) Inventors: Shinichiro Kadowaki, Omuta (JP); Nobuo Kawato, Kurume (JP); Masaru Kawaguchi, Omuta (JP)

(73) Assignee: MITSUI CHEMICALS, INC., Tokyo (JP)

( * ) Notice: Subject to any disclaimer, the term of this patent is extended or adjusted under 35 U.S.C. 154(b) by 324 days.

(21) Appl. No.: 16/332,434

(22) PCT Filed: Sep. 28, 2017

(86) PCT No.: PCT/JP2017/035207
§ 371 (c)(1),
(2) Date: Mar. 12, 2019

(87) PCT Pub. No.: WO2018/062384
PCT Pub. Date: Apr. 5, 2018

(65) Prior Publication Data
US 2021/0054126 A1 Feb. 25, 2021

(30) Foreign Application Priority Data

Sep. 30, 2016 (JP) .............................. JP2016-194497
Feb. 20, 2017 (JP) .............................. JP2017-029044
Jul. 13, 2017 (JP) .............................. JP2017-137029

(51) Int. Cl.
| | |
|---|---|
| *C08F 222/10* | (2006.01) |
| *C08K 5/1545* | (2006.01) |
| *C09K 9/02* | (2006.01) |
| *G02B 1/04* | (2006.01) |
| *G02C 7/10* | (2006.01) |
| *G02C 7/12* | (2006.01) |

(52) U.S. Cl.
CPC ........ *C08F 222/102* (2020.02); *C08K 5/1545* (2013.01); *C09K 9/02* (2013.01); *G02B 1/041* (2013.01); *G02C 7/102* (2013.01); *G02C 7/12* (2013.01); *C08F 2800/20* (2013.01); *C09K 2211/1018* (2013.01)

(58) Field of Classification Search
CPC ............. C08F 222/102; C08F 2800/20; C08K 5/1545; C09K 9/02; C09K 2211/1018; G02C 7/12; G02C 7/102; G02B 1/041
See application file for complete search history.

(56) References Cited

U.S. PATENT DOCUMENTS

| | | |
|---|---|---|
| 4,594,288 A | 6/1986 | Dobigny et al. |
| 4,994,208 A | 2/1991 | Mcbain et al. |
| 5,110,881 A | 5/1992 | Mcbain et al. |
| 5,531,940 A | 7/1996 | Gupta et al. |
| 5,708,064 A | 1/1998 | Coleman et al. |
| 5,789,015 A | 8/1998 | Gupta et al. |
| 5,851,585 A | 12/1998 | Gupta et al. |
| 6,210,608 B1 | 4/2001 | Chan et al. |
| 6,419,873 B1 | 7/2002 | Buazza et al. |
| 6,444,860 B2 | 9/2002 | Chan et al. |
| 6,506,538 B1 | 1/2003 | Breyne et al. |
| 6,557,734 B2 | 5/2003 | Buazza et al. |
| 6,634,879 B2 | 10/2003 | Buazza et al. |
| 6,729,866 B2 | 5/2004 | Buazza et al. |

(Continued)

FOREIGN PATENT DOCUMENTS

| | | |
|---|---|---|
| CN | 1315948 A | 10/2001 |
| CN | 1339031 A | 3/2002 |

(Continued)

OTHER PUBLICATIONS

International Search Report (PCT/ISA/210) and Written Opinion (PCT/ISA/237) dated Dec. 12, 2017, by the Japanese Patent Office as the International Searching Authority for International Application No. PCT/JP2017/035207.

Extended European Search Report dated Apr. 24, 2020, by the European Patent Office in corresponding European Patent Application No. 17856333.4. (8 pages).

(Continued)

*Primary Examiner* — Bijan Ahvazi
(74) *Attorney, Agent, or Firm* — Buchanan, Ingersoll & Rooney PC

(57) ABSTRACT

A polymerizable composition for an optical material of the present invention includes (A) an allyl carbonate compound represented by General Formula (1) and including two or more allyloxycarbonyl groups; (B) a (meth)acrylate compound represented by General Formula (2) and including two or more (meth)acryl groups; and (C) a photochromic compound, in which, in 100% by weight in a total of the compound (A) and the compound (B), the compound (A) is included in an amount of more than 0% by weight and 30% by weight or less and the compound (B) is included in an amount of 70% by weight or more and less than 100% by weight.

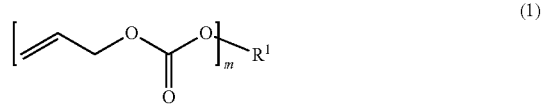

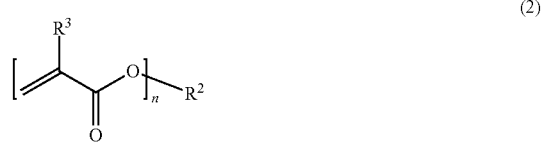

14 Claims, No Drawings

(56) References Cited

U.S. PATENT DOCUMENTS

| | | |
|---|---|---|
| 6,964,479 B2 | 11/2005 | Buazza et al. |
| 7,079,920 B2 | 7/2006 | Buazza et al. |
| 7,332,260 B2 | 2/2008 | Breyne et al. |
| 8,865,029 B2 | 10/2014 | Evans et al. |
| 9,335,566 B2 | 5/2016 | Kadowaki |
| 2001/0038890 A1 | 11/2001 | Buazza et al. |
| 2001/0047217 A1 | 11/2001 | Buazza et al. |
| 2001/0048002 A1 | 12/2001 | Buazza et al. |
| 2002/0006452 A1 | 1/2002 | Buazza et al. |
| 2002/0018824 A1 | 2/2002 | Buazza et al. |
| 2002/0076549 A1 | 6/2002 | Walch et al. |
| 2003/0169400 A1 | 9/2003 | Buazza et al. |
| 2003/0203065 A1 | 10/2003 | Buazza et al. |
| 2006/0065989 A1 | 3/2006 | Druffel et al. |
| 2010/0230650 A1* | 9/2010 | Nagoh ............... C08F 290/062 252/586 |
| 2011/0147681 A1* | 6/2011 | Evans .................... C08L 33/08 252/586 |
| 2014/0198296 A1 | 7/2014 | Kadowaki |
| 2015/0331147 A1* | 11/2015 | Ryu ................. C08G 18/3876 351/159.57 |

FOREIGN PATENT DOCUMENTS

| | | | |
|---|---|---|---|
| CN | 102112528 A | 6/2011 | |
| JP | S61144601 A | 7/1986 | |
| JP | H04502931 A | 5/1992 | |
| JP | H08127608 A | 5/1996 | |
| JP | H10147609 A | 6/1998 | |
| JP | H11513055 A | 11/1999 | |
| JP | 2004078052 A | 3/2004 | |
| JP | 2009019157 A * | 1/2009 | ............... C08F 18/24 |
| JP | 2009019157 A | 1/2009 | |
| JP | 2013213937 A | 10/2013 | |
| WO | 9510790 A1 | 4/1995 | |
| WO | 0056527 A1 | 9/2000 | |
| WO | 2006135390 A2 | 12/2006 | |
| WO | WO-2006135390 A2 * | 12/2006 | ............... G02B 1/14 |
| WO | 2012141306 A1 | 10/2012 | |

OTHER PUBLICATIONS

Office Action dated Oct. 9, 2020, by the China National Intellectual Property Administration in corresponding Chinese Patent Application No. 201780055136.4, (6 pages).

\* cited by examiner

POLYMERIZABLE COMPOSITION FOR OPTICAL MATERIAL AND MOLDED PRODUCT

TECHNICAL FIELD

The present invention relates to a polymerizable composition for an optical material including a photochromic compound and a molded product.

BACKGROUND ART

In comparison with inorganic lenses, plastic lenses are lighter and harder to break and have thus rapidly become widespread in optical elements such as spectacle lenses and camera lenses. In recent years, plastic lenses having a photochromic performance have been under development.

Patent Document 1 discloses that it is possible to provide a photochromic lens for spectacles having a high refractive index and excellent photochromic property by carrying out radical polymerization on a polymerizable composition including a photochromic compound and a specific structure of (meth)acrylate and divinylbenzene, using a cast polymerization method. The document also describes that it is possible to include a radical polymerization initiator in the polymerizable composition.

Patent Document 2 discloses that it is possible to provide a photochromic optical material having a photochromic property of fast photo-responsiveness and having various physical properties such as low specific gravity and impact resistance by carrying out radical polymerization on a composition including a photochromic compound, a polymerizable monomer having a di(meth)acryl group, and one kind or two kinds or more of radical polymerization initiators, using a cast polymerization method.

Patent Document 3 discloses that a photochromic curable composition, which includes diethylene glycol bisallyl carbonate and/or an oligomer thereof, two kinds of radical polymerization initiators having a predetermined half-life temperature, and a photochromic compound in predetermined ranges, is able to provide a photochromic spectacle lens which exhibits a good photochromic effect and which is excellent in mechanical or optical properties.

Patent Document 4 discloses that it is possible to provide a material excellent in photochromic response by including a polyol (allyl carbonate) component comprised of approximately 55 to approximately 90% by weight of polyol (allyl carbonate), approximately 10 to approximately 40% by weight of an aliphatic polyurethane having ethylenic unsaturation at a terminal, and approximately 0 to approximately 5% by weight of a bifunctional monomer selected from a group comprised of allyl methacrylate and allyl acrylate, and an organic photochromic substance. This document describes that it is possible to include a radical polymerization initiator in this material.

Patent Document 5 discloses a method for producing a plastic lens for spectacles in which polymerization is carried out by a low temperature polymerization step of heating a raw material liquid including two kinds of radical polymerization initiators having different half-life temperatures in a low temperature region of less than 90° C. and a high temperature polymerization step of heating in a high temperature region in a range of 90° C. to 100° C. performed thereafter.

Patent Document 6 discloses a method for producing a plastic lens having a step of carrying out radical polymerization on a composition including a (meth)acrylate-based monomer and two or more kinds of organic peroxides having different half-lives.

Patent Document 7 discloses a composition for a plastic lens including a polymerizable monomer or the like including an allyl group and two kinds of aliphatic organic peroxides having different half-life temperatures.

Patent Document 8 discloses a method for producing a plastic lens in which a monomer in which dimethallylphthalate is the main component and two kinds of aliphatic organic peroxides having different half-life temperatures as a polymerization initiator are blended, and the blend is polymerized and formed in a desired lens mold.

RELATED DOCUMENT

Patent Document

[Patent Document 1] WO2012/141306
[Patent Document 2] JP2004-078052
[Patent Document 3] JP2009-19157
[Patent Document 4] JPH04-502931
[Patent Document 5] JP2013-213937
[Patent Document 6] JPH10-147609
[Patent Document 7] JPH08-127608
[Patent Document 8] JPS61-144601

SUMMARY OF THE INVENTION

Technical Problem

In the techniques described in the above documents, there is room for improvement in the following points.

The (meth)acrylic base material in Patent Document 1 or 2 has a sufficient photochromic property; however, the obtained lens may be soft and may not be suitable for a lens for spectacles in terms of strength. The photochromic cured product containing allyl carbonate as in Patent Document 3 exhibits coloration and has room for improvement in the photochromic property. Furthermore, since the hardness is low, the product may be damaged during use or cracks may occur during processing. A photochromic material comprised of allyl carbonate and acryl having a large allyl carbonate amount ratio as in Patent Document 4 has low transparency and room for improvement in the photochromic property.

In addition, in a case of using a predetermined polymerizable monomer and two kinds of radical polymerization initiators having different half-life temperatures as in Patent Documents 5 to 8, there is room for improvement in the formability of the lens.

As a result of intensive studies, the present inventors found that, by copolymerizing a specific diallyl carbonate and (meth)acrylate at a specific ratio, it is possible to obtain a photochromic lens for spectacles which has excellent surface hardness and photochromic property without impairing transparency, and for which the formability is excellent and the product yield is improved. Furthermore, it was found that, compared to the photochromic property of a molded product in which each of diallyl carbonate and (meth)acrylate is cured alone, the photochromic property is improved more synergistically by carrying out copolymerization.

Solution to Problem

That is, it is possible to illustrate the present invention as follows.

[1] A polymerizable composition for an optical material including (A) an allyl carbonate compound represented by General Formula (1) and including two or more allyloxycarbonyl groups; (B) a (meth)acrylate compound represented by General Formula (2) and including two or more (meth)acryl groups; and (C) a photochromic compound, in which, in 100% by weight in a total of the compound (A) and the compound (B), the compound (A) is included in an amount of more than 0% by weight and 30% by weight or less and the compound (B) is included in an amount of 70% by weight or more and less than 100% by weight.

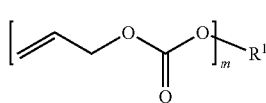

($R^1$ indicates a divalent to 20 valent group derived from a linear or branched aliphatic polyol having 3 to 35 carbon atoms which optionally include a hetero atom or a divalent to 20 valent group derived from a cycloaliphatic polyol having 5 to 40 carbon atoms which optionally include a hetero atom, M indicates an integer of 2 to 10, and $R^1$ does not include an allyloxycarbonyl group),

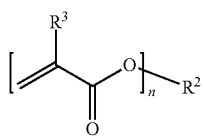

($R^2$ indicates a divalent to tetravalent organic group having 1 to 30 carbon atoms which optionally include a hetero atom or an aromatic group, $R^3$ indicates a hydrogen atom or a methyl group, and n indicates an integer of 2 to 4)

[2] The polymerizable composition for an optical material according to [1], in which, in 100% by weight in the total of the compound (A) and the compound (B), the compound (A) is included in an amount of 5% by weight or more and 30% by weight or less and the compound (B) is included in an amount of 70% by weight or more and 95% by weight or less.

[3] The polymerizable composition for an optical material according to [1] or [2], further including a radical polymerization initiator (D), in which the radical polymerization initiator (D) includes at least a radical polymerization initiator ($D_1$) having a radical residual ratio of 20% or more and less than 100% after 5 hours at 50° C. and a radical residual ratio of 0% or more and less than 30% after 5 hours at 70° C., and a radical polymerization initiator (D2) having a radical residual ratio of 30% or more and less than 100% after 5 hours at 70° C.

[4] The polymerizable composition for an optical material according to any one of [1] to[3], in which the compound (A) is at least one kind selected from a bis(allyl carbonate) compound of at least one kind of diol selected from diethylene glycol, dipropylene glycol, triethylene glycol, tetraethylene glycol, 1,3-propanediol, 1,4-butanediol, 1,5-pentanediol, 1,6-hexanediol, neopentyl glycol, 3-methyl-1,5-pentanediol, 2-methyl-2-ethyl-1,3-propanediol, 2,2-diethyl-1,3-propanediol, 2,2,4-trimethyl-1,3-pentanediol, 1,4-dimethylolcyclohexane, and 4,8-bis(hydroxymethyl)-[5.2.1.0$^{2,6}$]tricyclodecane, a tris(allyl carbonate) compound of at least one kind of triol selected from glycerol, trimethylolpropane, and tris(hydroxyethyl) isocyanurate, a tetra(allyl carbonate) compound of at least one kind of tetraol selected from pentaerythritol, diglycerol, and ditrimethylol propane, a dipentaerythritol hexa(allyl carbonate) compound, and a mixed poly(allyl carbonate) compound of at least two kinds of compounds selected from the diols, the triols, the tetraols, and the dipentaerythritol.

[5] The polymerizable composition for an optical material according to any one of [1] to [4], in which the compound (A) is at least one kind selected from (i) a mixture of a diethylene glycol bis(allyl carbonate) compound and an oligomer thereof, (ii) a mixture of a bis(allyl carbonate) compound of a mixture of diethylene glycol and neopentyl glycol and an oligomer thereof, (iii) a mixture of a poly(allyl carbonate) compound of a mixture of diethylene glycol and tris(hydroxyethyl) isocyanurate and an oligomer thereof, (iv) a mixture of a poly(allyl carbonate) compound of a mixture of diethylene glycol and trimethylolpropane and an oligomer thereof, (v) a mixture of a poly(allyl carbonate) compound of a mixture of diethylene glycol and pentaerythritol and an oligomer thereof, (vi) a mixture of a poly(allyl carbonate) compound of a mixture of diethylene glycol, neopentyl glycol and pentaerythritol and an oligomer thereof, and (vii) a poly(allyl carbonate) mixture comprising a mixture of a poly(allyl carbonate) compound of a mixture of diethylene glycol, neopentyl glycol, and pentaerythritol and an oligomer thereof, and a mixture of a diethylene glycol bis(allyl carbonate) compound and an oligomer thereof.

[6] The polymerizable composition for an optical material according to any one of [1] to [5], in which the compound (B) is selected from compounds represented by General Formula (2-1) and General Formula (2-2);

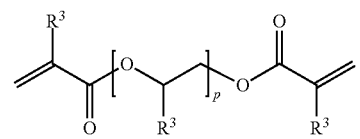

wherein, p indicates a numerical value of 1 to 100, $R^3$ indicates a hydrogen atom or a methyl group, and may not be the same as each other,

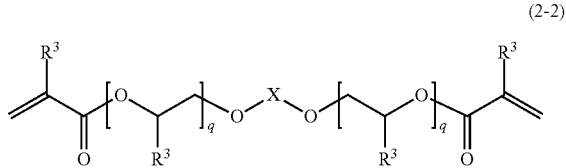

wherein, q indicates a numerical value of 1 or more and a total of two q's represents a numerical value of 2 to 100, $R^3$ indicates a hydrogen atom or a methyl group and may not be the same as each other, X indicates a substituted or unsubstituted divalent aromatic group or a substituted or unsubstituted divalent aliphatic group which optionally include an aromatic group having 1 to 20 carbon atoms.

[7] The polymerizable composition for an optical material according to [6], in which the compound (B) is selected from compounds represented by General Formula (2-1) in which p is 2 to 4.

[8] The polymerizable composition for an optical material according to [7], in which the compound (B) is at least one kind selected from diethylene glycol dimethacrylate, triethylene glycol dimethacrylate, diethylene glycol diacrylate, and triethylene glycol diacrylate.

[9] The polymerizable composition for an optical material according to any one of [1] to [8], in which the compound (C) is represented by General Formula (5),

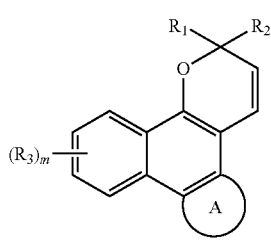

(5)

wherein, in the formula, $R^1$ and $R^2$ may be the same or different and independently represent hydrogen; a linear or branched alkyl group having 1 to 12 carbon atoms; a cycloalkyl group having 3 to 12 carbon atoms; a substituted or unsubstituted aryl group having 6 to 24 carbon atoms or heteroaryl group having 4 to 24 carbon atoms (as the substituent, there is at least one substituent selected from a halogen atom, a hydroxyl group, a linear or branched alkyl group having 1 to 12 carbon atoms, a linear or branched alkoxy group having 1 to 12 carbon atoms, a linear or branched haloalkyl group having 1 to 12 carbon atoms substituted with at least one halogen atom, a linear or branched haloalkoxy group having 1 to 12 carbon atoms substituted with at least one halogen atom, a phenoxy group or naphthoxy group substituted with at least one linear or branched alkyl group or alkoxy group having 1 to 12 carbon atoms, a linear or branched alkenyl group having 2 to 12 carbon atoms, an —$NH_2$ group, an —NHR group, and an —$N(R)_2$ group (R is a linear or branched alkyl group having 1 to 6 carbon atoms, and when two R's are present, two R's may be the same or different), and a methacryloyl group or an acryloyl group); or an aralkyl or heteroaralkyl group (a linear or branched alkyl group having 1 to 4 carbon atoms is substituted with the aryl group or heteroaryl group), $R^3$ may be the same or different and independently represent a halogen atom; a linear or branched alkyl group having 1 to 12 carbon atoms; a cycloalkyl group having 3 to 12 carbon atoms; a linear or branched alkoxy group having 1 to 12 carbon atoms; a linear or branched haloalkyl group having 1 to 12 carbon atoms substituted with at least one halogen atom, a halocycloalkyl group having 3 to 12 carbon atoms substituted with at least one halogen atom, and a linear or branched haloalkoxy group having 1 to 12 carbon atoms substituted with at least one halogen atom; a substituted or unsubstituted aryl group having 6 to 24 carbon atoms or heteroaryl group having 4 to 24 carbon atoms (as the substituent, there is at least one substituent selected from a halogen atom, a hydroxyl group, a linear or branched alkyl group having 1 to 12 carbon atoms, a linear or branched alkoxy group having 1 to 12 carbon atoms, a linear or branched haloalkyl group having 1 to 12 carbon atoms substituted with at least one halogen atom, a linear or branched haloalkoxy group having 1 to 12 carbon atoms substituted with at least one halogen atom, a phenoxy group or naphthoxy group substituted with at least one linear or branched alkyl group or alkoxy group having 1 to 12 carbon atoms, a linear or branched alkenyl group having 2 to 12 carbon atoms, and an amino group); an aralkyl or heteroaralkyl group (a linear or branched alkyl group having 1 to 4 carbon atoms is substituted with the aryl group or heteroaryl group); a substituted or unsubstituted phenoxy or naphthoxy group (as a substituent, there is at least one substituent selected from a linear or branched alkyl group or alkoxy group having 1 to 6 carbon atoms); —NH2, —NHR, —CONH2, or —CONHR (R is a linear or branched alkyl group having 1 to 6 carbon atoms); or —$OCOR^8$ or —$COOR^8$ (here, $R^8$ is a linear or branched alkyl group having 1 to 6 carbon atoms or a cycloalkyl group having 3 to 6 carbon atoms or, in $R^1$ and $R^2$, a phenyl group substituted with at least one substituent of a substituted aryl or substituted heteroaryl group or an unsubstituted phenyl group), m is an integer of 0 to 4, A represents an annelated ring of Formula ($A_2$) or Formula ($A_4$),

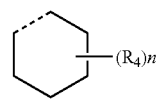

($A_2$)

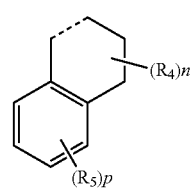

($A_4$)

in these annelated rings, a dotted line represents a carbon C5 carbon and C6 bond of a naphthopyran ring of General Formula (5), an α bond of the annelated ring ($A_4$) is able to be bonded to carbon C5 or carbon C6 of the naphthopyran ring of General Formula (5), $R^4$'s are the same or different and independently represent OH, a linear or branched alkyl group or alkoxy group having 1 to 6 carbon atoms, or two $R_4$'s form carbonyl (CO), $R^5$ is halogen; a linear or branched alkyl group having 1 to 12 carbon atoms; a linear or branched haloalkyl group having 1 to 6 carbon atoms substituted with at least one halogen atom; a cycloalkyl group having 3 to 12 carbon atoms; a linear or branched alkoxy group having 1 to 6 carbon atoms; a substituted or unsubstituted phenyl or benzyl group (as a substituent, when the $R^1$ and $R^2$ groups of General Formula (5) independently correspond to an aryl or heteroaryl group, there is at least one of the substituents described above in the definitions of $R^1$ and $R^2$ group); —NH2, —NHR (here, R is a linear or branched alkyl group having 1 to 6 carbon atoms); a substituted or unsubstituted phenoxy or naphthoxy group (as a substituent, there is a linear or branched alkyl group or alkoxy group having at least 1 to 6 carbon atoms); or —$COR_9$, —$COOR_9$, or a —$CONHR_9$ group (here, $R^9$ is a linear or branched alkyl group having 1 to 6 carbon atoms, a cycloalkyl group having 3 to 6 carbon atoms, or a substituted or unsubstituted phenyl or benzyl group (as a substituent, when the substituents $R^1$ and $R^2$ of General Formula (5) independently correspond to an aryl or heteroaryl group, there is at least one substituent described above in the definitions of the $R^1$ and $R^2$); and, when A indicates (A₄), n is an integer of 0 to 2, p is an integer of 0 to 4, and A when indicates (A₂), n is an integer of 0 to 2.

[10] The polymerizable composition for an optical material according to any one of [1] to [8], in which the compound (C) is represented by General Formula (a) or General Formula (b).

PC-L-Chain  (a)

PC-L-Chain-L'-PC'  (b)

wherein, PC and PC' indicate General Formulas (c) to (f), and PC and PC' may be the same or different,

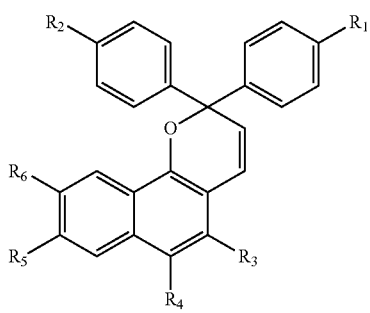
(c)

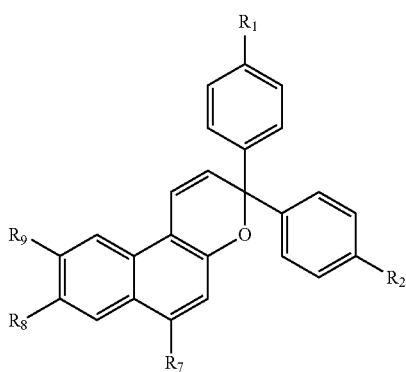
(d)

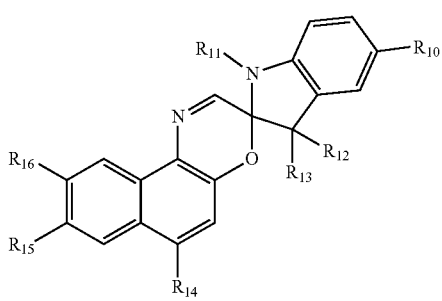
(e)

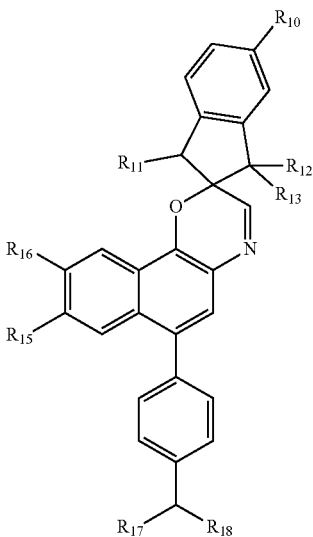
(f)

wherein, $R^1$ to $R^{18}$ indicate hydrogen, a halogen atom, a carboxyl group, an acetyl group, a formyl group, an aliphatic group having 1 to 20 carbon atoms which optionally be substituted, an alicyclic group having 3 to 20 carbon atoms which optionally be substituted, or an aromatic organic group having 6 to 20 carbon atoms which optionally be substituted, and may be the same as or different from each other, and these aliphatic, alicyclic, or aromatic organic groups may include an oxygen atom and a nitrogen atom, any one of the groups included in the compounds represented by General Formulas (c) to (f) is bonded to L or L' which is a divalent organic group, L and L' indicate a divalent organic group including one kind or more selected from an oxyethylene chain, an oxypropylene chain, a (thio) ester group, and a (thio)amide group, and Chain indicates a monovalent or divalent organic group including one kind or more selected from a polysiloxane chain and a polyoxyalkylene chain.

[11] A molded product obtained by curing the polymerizable composition for an optical material according to any one of [1] to [10].

[12] An optical material comprised of the molded product according to [11].

[13] A plastic lens comprised of the molded product according to [11].

[14] A plastic polarizing lens including a polarizing film; and a base material layer formed on a surface of at least an objective surface side of the polarizing film and comprised of the molded product according to [11].

In the present invention, for example, "a diol bis(allyl carbonate) compound" means a compound having a structure in which two hydroxyl groups of a diol are replaced with allyl carbonate groups. One kind of diol may be used, or two or more kinds may be used in combination.

In the present invention, for example, "a bis(allyl carbonate) compound of a mixture of diethylene glycol and neopentyl glycol" means (1) a compound having a structure in which two hydroxyl groups of diethylene glycol are replaced with allyl carbonate groups, and (2) a compound having a structure in which two hydroxyl groups of neopentyl glycol are replaced with allyl carbonate groups.

In addition, in the present invention, for example, "an oligomer of a bis(allyl carbonate) compound of a mixture of diethylene glycol and neopentyl glycol" means any one of the following (3), (4), or (5), or a mixture of two or more kinds selected from the above. (3) Oligomer of bis(allyl carbonate) compound of diethylene glycol A compound having a structure in which two or more molecules of diethylene glycol are oligomerized via a carbonate bond and a terminal hydroxyl group is substituted with an allyl carbonate group. (4) Oligomer of bis(allyl carbonate) compound of neopentyl glycol A compound having a structure in which two or more molecules of neopentyl glycol are oligomerized via a carbonate bond and terminal hydroxyl groups are substituted with allyl carbonate groups. (5) Oligomer of bis(allyl carbonate) compound of diethylene glycol and neopentyl glycol A compound having a structure in which one molecule or more of diethylene glycol and one molecule or more of neopentyl glycol are oligomerized in the same molecule in a random combination via a carbonate bond and a terminal hydroxyl group is substituted with an allyl carbonate group.

The same also applies to a case of a "bis(allyl carbonate) compound of a trifunctional or higher polyol" and a "bis (allyl carbonate) compound using two or more kinds of diols and trifunctional or higher polyols".

In a case of "an oligomer of a bis(allyl carbonate) compound of a trifunctional or higher polyol" and "an oligomer of a bis(allyl carbonate) compound using two or more kinds of diols and trifunctional or higher polyols", a structure in which all terminal hydroxyl groups are substituted with an allyloxycarbonate group and a structure in which some of the terminal hydroxyl groups are substituted with an allyloxycarbonate group are included.

In addition, in the present invention, for example, "1 to 10" means "1 or more and 10 or less".

In addition, in the present invention, a hetero atom means an atom other than C and H.

Advantageous Effects of Invention

According to the polymerizable composition for an optical material of the present invention, it is possible to provide a photochromic lens for spectacles which has both excellent surface hardness and photochromic property without impairing transparency. Furthermore, the formability is excellent and the yield of the photochromic lens is improved.

DESCRIPTION OF EMBODIMENTS

A description will be given of the polymerizable composition for an optical material of the present invention based on the following embodiments.

The polymerizable composition for an optical material of the present embodiment includes (A) an allyl carbonate compound represented by General Formula (1) and including two or more allyloxycarbonyl groups;

(B) a (meth)acrylate compound represented by General Formula (2) and including two or more (meth)acryl groups; and (C) a photochromic compound, in which, in 100% by weight in a total of the compound (A) and the compound (B), the compound (A) is included in an amount of more than 0% by weight and 30% by weight or less and the compound (B) is included in an amount of 70% by weight or more and less than 100% by weight.

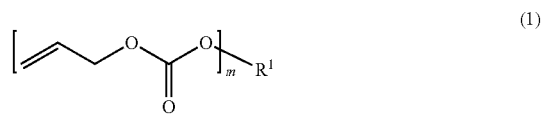

$R^1$ indicates a divalent to 20 valent group derived from a linear or branched aliphatic polyol having 3 to 35 carbon atoms which optionally include a hetero atom or a divalent to 20 valent group derived from a cycloaliphatic polyol having 5 to 40 carbon atoms which optionally include a hetero atom. m indicates an integer of 2 to 10. $R^1$ does not include an allyloxycarbonyl group.

$R^2$ indicates a divalent to tetravalent organic group having 1 to 30 carbon atoms which optionally include a hetero atom or an aromatic group. $R^3$ indicates a hydrogen atom or a methyl group. n indicates an integer of 2 to 4.

According to the polymerizable composition for an optical material of the present embodiment, it is possible to obtain a photochromic lens for spectacles which has both excellent surface hardness and photochromic property without impairing transparency and for which the formability is excellent and the yield of the photochromic lens is improved.

A description will be given below of each component.
[(A) Allyl Carbonate Compound]

It is possible to represent the allyl carbonate compound (A) in the present embodiment by the following formula.

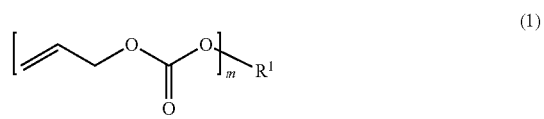

$R^1$ indicates a divalent to 20 valent group derived from a linear or branched aliphatic polyol having 3 to 35 carbon atoms which optionally include a hetero atom or a divalent to 20 valent group derived from a cycloaliphatic polyol having 5 to 40 carbon atoms which optionally include a hetero atom. m indicates an integer of 2 to 10. $R^1$ does not include an allyloxycarbonyl group.

It is possible for the allyl carbonate compound (A) to include an oligomer thereof. The oligomer is, for example, a poly(allyl carbonate) in which two or more molecules of polyol are linked via a carbonate bond, which is formed by a transesterification reaction between diallyl carbonate and a polyol. The allyl carbonate compound is a poly(allyl carbonate) of a linear or branched chain aliphatic polyol having 3 to 35 carbon atoms. A poly(allyl carbonate) of a cycloaliphatic polyol having 5 to 40 carbon atoms in the molecule is also suitable for this purpose. Usually, it is possible for these polyols to have 2 to 6 hydroxyl groups in the molecule, and preferably 2 to 4 hydroxyl groups. It is also possible to use a mixed poly(allyl carbonate), that is, a mixture derived from two or more polyols and able to be obtained by mixing poly(allyl carbonate) of single polyols or a mixture which is directly obtained by a chemical reaction started from a mixture of polyols and diallyl carbonate. Finally, it is possible for all these poly(allyl carbonates) to be in the form of monomers or mixtures of monomers and oligomers.

Specific examples of the polyol forming $R^1$ of General Formula (1) include diethylene glycol, dipropylene glycol, triethylene glycol, tetraethylene glycol, 1,3-propanediol, 1,4-butanediol, 1,5-pentanediol, 1,6-hexanediol, neopentyl glycol, 3-methyl-1,5-pentanediol, 2-methyl-2-ethyl-1,3-propanediol, 2,2-diethyl-1,3-propanediol, 2,2,4-trimethyl-1,3-pentanediol, 1,4-dimethylolcyclohexane, 4,8-bis(hydroxymethyl)-[5.2.1.0$^{2,6}$] tricyclodecane, glycerol, trimethylolpropane, tris(hydroxyethyl) isocyanurate, pentaerythritol, diglycerol, ditrimethylolpropane, dipentaerythritol, and the like.

Accordingly, examples of the allyl carbonate compound (A) include at least one kind selected from bis(allyl carbonate) compounds of at least one kind of diol selected from diethylene glycol, dipropylene glycol, triethylene glycol, tetraethylene glycol, 1,3-propanediol, 1,4-butanediol, 1,5-pentanediol, 1,6-hexanediol, neopentyl glycol, 3-methyl-1,5-pentanediol, 2-methyl-2-ethyl-1,3-propanediol, 2,2-diethyl-1,3-propanediol, 2,2,4-trimethyl-1,3-pentanediol, 1,4-dimethylolcyclohexane, and 4,8-bis(hydroxymethyl)-[5.2.1.0$^{2,6}$] tricyclodecane; tris(allyl carbonate) compounds of at least one kind of triol selected from glycerol, trimethylolpropane, and tris(hydroxyethyl) isocyanurate; tetra(allyl carbonate) compounds of at least one kind of tetraol selected from pentaerythritol, diglycerol, and ditrimethylol propane; dipentaerythritol hexa(allyl carbonate) compounds; and a mixed poly(allyl carbonate) compound of at least two kinds of compounds selected from the diols, the triols, the tetraols, and the dipentaerythritol.

The "bis(allyl carbonate) of a mixture of at least two kinds of diols" is, for example, obtained as a mixture of the following monomer components and oligomer components in a case where the diols are diethylene glycol and neopentyl glycol.

Monomer Component
(1) Diethylene glycol bis(allyl carbonate)
(2) Neopentyl glycol bis(allyl carbonate)

Oligomer Component
(3) Oligomer including only hydrocarbons (and ethers) derived from diethylene glycol
(4) Oligomer including only hydrocarbons derived from neopentyl glycol
(5) Complex oligomer including both hydrocarbons (and ethers) derived from diethylene glycol and a hydrocarbon derived from neopentylglycol in the same molecule The following are preferable examples of allyl carbonate polymerizable compounds suitable for the purpose of the present invention.

(i) Mixture of Bis(Allyl Carbonate) Compound of Diethylene Glycol and an Oligomer Thereof It is possible to define the diethylene glycol bis(allyl carbonate) by Formula (1-1).

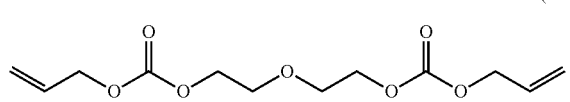

(1-1)

It is possible to define an oligomer of diethylene glycol bis(allyl carbonate) by Formula (1-2).

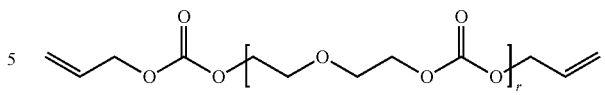

(1-2)

In the formula, r is 2 or more.

It is possible to manufacture compound (1-1) by reacting diethylene glycol bis(chloroformate) with allyl alcohol as described in, for example, "Encyclopedia of Chemical Technology", Kirk-Othmer, Third Edition, Volume 2, pages 111-112. It is possible to easily produce mixtures of diethylene glycol-bis(allyl carbonate) (Formula (1-1)) and an oligomer (Formula (1-2)) thereof by ester replacement between diallyl carbonate and diethylene glycol in the presence of a basic catalyst, for example, as described in EP 35,304. These mixtures usually include up to approximately 80% by weight of oligomers.

(ii) Mixture of Bis(Allyl Carbonate) Compound of a Mixture of Diethylene Glycol and Neopentyl Glycol with Oligomers Thereof This bis(allyl carbonate) compound is the same as the bis(allyl carbonate) compound of point (i) above except that diethylene glycol is replaced with a mixture of diethylene glycol and neopentyl glycol.

(iii) Mixture of Poly(Allyl Carbonate) Compound of a Mixture of Diethylene Glycol and Tris(Hydroxyethyl) Isocyanurate with Oligomers Thereof It is possible to obtain the poly(allyl carbonate) compound by ester replacement of a diallyl carbonate of a mixture of diethylene glycol and tris(hydroxyethyl) isocyanurate, for example, as described in U.S. Pat. No. 4,812,545.

(iv) Mixture of Poly(Allyl Carbonate) Compound of a Mixture of Diethylene Glycol and Trimethylolpropane with Oligomers Thereof This poly(allyl carbonate) compound is the same as the poly(allyl carbonate) compound of point (iii) above, except that tris(hydroxyethyl) isocyanurate is replaced with trimethylol propane.

(v) Mixture of Poly(Allyl Carbonate) Compound of a Mixture of Diethylene Glycol and Pentaerythritol with Oligomers Thereof This poly(allyl carbonate) compound is the same as the poly(allyl carbonate) compound of point (iii) above, except that tris(hydroxyethyl) isocyanurate is replaced with pentaerythritol.

(vi) Mixture of Poly(Allyl Carbonate) Compound of a Mixture of Diethylene Glycol, Neopentyl Glycol, and Pentaerythritol with Oligomers Thereof This poly(allyl carbonate) compound is the same as the poly(allyl carbonate) compound of point (v) above, except that diethylene glycol is replaced with two kinds of diols of diethylene glycol and neopentyl glycol.

(vii) Poly(Allyl Carbonate) Mixture Including a Mixture of Poly(Allyl Carbonate) Compound of a Mixture of Diethylene Glycol, Neopentyl Glycol, and Pentaerythritol with Oligomers Thereof and a Mixture of Diethylene Glycol Bis(Allyl Carbonate) Compound with Oligomers Thereof

[(B) (Meth)Acrylate Compound]

It is possible to represent the (meth)acrylate compound (B) in the present invention by the following formula.

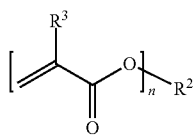

(2)

R² indicates a divalent to tetravalent organic group having 1 to 30 carbon atoms which optionally include a hetero atom or an aromatic group. R³ indicates a hydrogen atom or a methyl group. n indicates an integer of 2 to 4.

In addition, examples of the (meth)acrylate compound (B) include the compounds represented by General Formula (2-1) and General Formula (2-2).

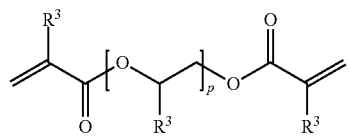

(2-1)

p indicates a numerical value of 1 to 100. R³ indicates a hydrogen atom or a methyl group, and may not be the same as each other. p is preferably a numerical value of 1 to 50, more preferably a numerical value of 1 to 20, still more preferably a numerical value of 2 to 10, and particularly preferably a numerical value of 2 to 4.

Examples of the (meth)acrylate compound represented by General Formula (2-1) include at least one kind selected from ethylene glycol dimethacrylate, diethylene glycol dimethacrylate, triethylene glycol dimethacrylate, tetraethylene glycol dimethacrylate, ethylene glycol diacrylate, diethylene glycol diacrylate, triethylene glycol diacrylate, tetraethylene glycol diacrylate, propylene glycol dimethacrylate, dipropylene glycol dimethacrylate, tripropylene glycol dimethacrylate, tetrapropylene glycol dimethacrylate, propylene glycol diacrylate, dipropylene glycol diacrylate, tripropylene glycol diacrylate, and tetrapropylene glycol acrylate.

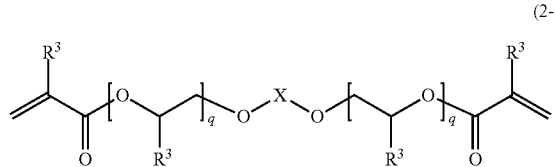

(2-2)

q indicates a numerical value of 1 or more and a total of two q's indicates a numerical value of 2 to 100. R³'s indicate a hydrogen atom or a methyl group and may not be the same as each other. X indicates a substituted or unsubstituted divalent aromatic group or a substituted or unsubstituted divalent aliphatic group which optionally include an aromatic group having 1 to 20 carbon atoms.

Examples of the (meth)acrylate compound represented by General Formula (2-2) include at least one kind selected from bisphenol A dimethacrylate, methylene-bis-(4,1-phenylene)-bis-(2-methacrylate), bisphenol A diacrylate, methylene-bis-(4,1-phenylene)-bis-(2-acrylate), 2,2-bis-(4-methacryloyloxyphenyl)propane, 2,2-bis-(4-acryloyloxyphenyl)propane, 2-(4-methacryloyloxyphenyl)-2-(4-methacryloyloxyethoxyphenyl)propane, 2-(4-acryloyloxyphenyl)-2-(4-acryloyloxyethoxyphenyl) propane, 2,2-bis-(4-methacryloyloxyethoxyphenyl)propane, 2,2-bis-(4-acryloyloxyethoxyphenyl)propane, 2-(4-methacryloyloxyethoxyphenyl)-2-(4-(methacryloyloxyethoxy) ethoxyphenyl)propane, 2-(4-acryloyloxyethoxyphenyl)-2-(4-(acryloyloxyethoxy)ethoxyphenyl)propane, 2,2-bis-(4-(methacryloyloxyethoxy)ethoxyphenyl)propane, 2,2-bis-(4-(acryloyloxyethoxy)ethoxyphenyl)propane.

Examples of (meth)acrylate compounds other than the above include at least one kind selected from the group comprised of butanediol dimethacrylate, hexamethylene dimethacrylate, 2,2-bis(4-methacryloyloxyethoxy-3,5-dibromophenyl) propane, 2,2-bis-(4-methacryloyloxypentaethoxyphenyl) propane, pentaerythritol triacrylate, pentaerythritol tetraacrylate, trimethylolpropane triacrylate, dipentaerythritol hexaacrylate, bisphenol A diglycidyl ether diacrylate, bisphenol A diglycidyl ether dimethacrylate, tetrabromobisphenol A diglycidyl ether diacrylate, and tetrabromobisphenol A diglycidyl ether dimethacrylate.

Among these exemplified compounds, the (meth)acrylate compound (B) is preferably at least one kind selected from diethylene glycol dimethacrylate, triethylene glycol dimethacrylate, diethylene glycol diacrylate, triethylene glycol diacrylate, dipropylene glycol dimethacrylate, tripropylene glycol dimethacrylate, dipropylene glycol diacrylate, and tripropylene glycol diacrylate, more preferably at least one kind selected from diethylene glycol dimethacrylate, triethylene glycol dimethacrylate, diethylene glycol diacrylate, and triethylene glycol diacrylate, and particularly preferably at least one kind selected from diethylene glycol dimethacrylate, and triethylene glycol dimethacrylate.

In a total of 100% by weight of the compound (A) and the compound (B), the allyl carbonate compound (A) is able to be included as more than 0% by weight to 30% by weight or less, preferably 5% by weight or more and 30% by weight or less, more preferably 5% by weight or more and 28% by weight or less, and particularly preferably 5% by weight or more and 25% by weight or less, and the (meth)acrylate compound (B) is able to be included as 70% by weight or more and less than 100% by weight, preferably 70% by weight or more and 95% by weight or less, more preferably 72% by weight or more and 95% by weight or less, and particularly preferably 75% by weight or more and 95% by weight or less.

When the allyl carbonate compound (A) is included, the result is excellent in terms of having a high fading rate and a photochromic property such as a high color density and the mechanical strength as a lens is increased. In addition, when the content is 30% by weight or less, the transparency is excellent. That is, including the compound (A) and the compound (B) in this range makes it possible for the obtained resin molded product to exhibit sufficient photochromic property and mechanical strength, and white cloudiness is suppressed and the transparency is excellent. Furthermore, the formability is excellent and the yield of the photochromic lens is improved.

[(C) Photochromic Compound]

In the present embodiment, the photochromic compound (C) is not particularly limited and it is possible to arbitrarily select and use compound from compounds known in the related art which are able to be used for photochromic lenses. It is possible to use one kind or two or more kinds, for example, a spiropyran-based compound, a spirooxazine-based compound, a fulgide-based compound, a naphthopyran-based compound, and a bisimidazole compound according to the desired coloration, and it is also possible to use at least one kind selected from General Formula (a) and General Formula (b) described below.

Examples of spiropyran-based compounds include each substituent in which an indole ring and benzene ring of indolinospirobenzopyran are substituted with halogen, methyl, ethyl, methylene, ethylene, a hydroxyl group, or the like, each substituent in which an indole ring and a naphthalene ring of indolinospironaphthopyran are substituted with halogen, methyl, ethyl, methylene, ethylene, a hydroxyl group, or the like, each substituent in which an indole ring of indolinospiroquinolinopyran is substituted with halogen, methyl, ethyl, methylene, ethylene, a hydroxyl group, or the like, each substituent in which an indole ring of indolinospiropyridopyran is substituted with halogen, methyl, ethyl, methylene, ethylene, a hydroxyl group, or the like, and the like.

Examples of spirooxazine-based compounds include each substituent in which an indole ring and a benzene ring of an indolinospirobenzoxazine is substituted with halogen, methyl, ethyl, methylene, ethylene, a hydroxyl group, or the like, each substituent in which an indole ring and naphthalene ring of indolinospironnaphthoxazine is substituted with halogen, methyl, ethyl, methylene, ethylene, hydroxyl group, or the like, each substituent in which an indole ring of indolinospirophenanthoxazine is substituted with halogen, methyl, ethyl, methylene, ethylene, hydroxyl group, or the like, each substituent in which an indole ring of indolinospiroquinolinooxazine is substituted with halogen, methyl, ethyl, methylene, ethylene, hydroxyl group, or the like, each substituent in which a piperidine ring and naphthalene ring of piperidinospironaphthoxazine are substituted with halogen, methyl, ethyl, methylene, ethylene, a hydroxyl group, or the like, and the like.

Examples of fulgide-based compounds include N-cyanomethyl-6,7-dihydro-4-methyl-2-phenylspiro(5,6-benzo[b]thiophenedicarboximido-7,2'-tricyclo[3.3.1.1$^{3,7}$]decane], N-cyanomethyl-6,7-dihydro-2-(p-methoxyphenyl)-4-methylspiro(5,6-benzo[b]thiophenedicarboximido-7,2'-tricyclo[3.3.1.1$^{3,7}$]decane), 6,7-dihydro-N-methoxycarbonylmethyl-4-methyl-2-phenylspiro(5,6-benzo[b]thiophenedicarboximido-7,2'-tricyclo[3.3.1.1$^{3,7}$]decane), 6,7-dihydro-4-methyl-2-(p-methylphenyl)-N-nitromethylspiro(5,6-benzo[b]thiophenedicarboxyimido-7,2'-tricyclo[3.3.1.1$^{3,7}$]decane), N-cyanomethyl-6,7-dihydro-4-cyclopropyl-3-methylspiro(5,6-benzo[b]thiophenedicarboximido-7,2'-tricyclo[3.3.1.1$^{3,7}$]decane), N-cyanomethyl-6,7-dihydro-4-cyclopropylspiro(5,6-benzo[b]thiophenedicarboximido-7,2'-tricyclo[3.3.1.1$^{3,7}$]decane), N-cyanomethyl-6,7-dihydro-2-(p-methoxyphenyl)-4-cyclopropylspiro (5,6-benzo[b]thiophenedicarboximido-7,2'-tricyclo[3.3.1.1$^{3,7}$]decane), and the like.

Examples of naphthopyran-based compounds include spiro[norbornane-2,2'-[2H]benzo[h]chromene], spiro[bicyclo[3.3.1]nonane-9,2'-[2H]benzo[h]chromene], 7'-methoxyspiro[bicyclo[3.3.1]nonane-9,2'-[2H]benzo[h]chromene], 7'-methoxyspiro[norbornane-2,2'-[2H]benzo[f]chromene], 2,2-dimethyl-7-octoxy[2H] benzo[h] chromene, spiro[2-bicyclo[3.3.1]nonene-9,2'-[2H]benzo[h]chromene], spiro[2-bicyclo[3.3.1]nonene-9,2'-[2H]benzo[f]chromene], 6-morpholino-3,3-bis(3-fluoro-4-methoxyphenyl)-3H-benzo (f) chromene, 5-isopropyl-2,2-diphenyl-2H-benzo(h) chromene, and the like and compounds represented by General Formula (3) or compounds represented by General Formula (4).

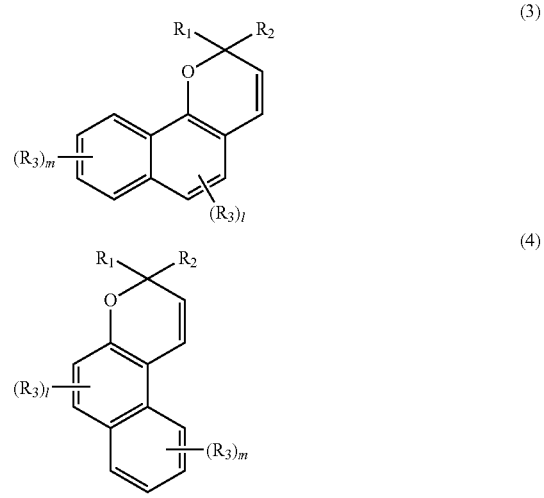

In General Formula (3) and General Formula (4), $R^1$ and $R^2$ may be the same or different, and independently indicate hydrogen; a linear or branched alkyl group having 1 to 12 carbon atoms; a cycloalkyl group having 3 to 12 carbon atoms; an aryl group having 6 to 24 carbon atoms or a heteroaryl group having 4 to 24 carbon atoms, which is substituted or unsubstituted; an aralkyl or heteroaralkyl group (a linear or branched alkyl group having 1 to 4 carbon atoms is substituted with the aryl group or heteroaryl group).

The substituent of the substituted aryl group having 6 to 24 carbon atoms or the substituted heteroaryl group having 4 to 24 carbon atoms is at least one kind selected from a halogen atom, a hydroxyl group, a linear or branched alkyl group having 1 to 12 carbon atoms, a linear or branched alkoxy group having the 1 to 12 carbon atoms, a linear or branched haloalkyl group having 1 to 12 carbon atoms substituted with at least one halogen atom, a linear or branched haloalkoxy group having 1 to 12 carbon atoms substituted with at least one halogen atom, a phenoxy group or naphthoxy group substituted with at least one linear or branched alkyl group or alkoxy group having 1 to 12 carbon atoms, a linear or branched alkenyl group having 2 to 12 carbon atoms, —NH$_2$ group, —NHR group, —N(R)$_2$ group (R is a linear or branched alkyl group having 1 to 6 carbon atoms, and in a case where two R's are present, the two R may be the same or different), and a methacryloyl group or an acryloyl group.

$R_3$, which may be the same or different, independently represents a halogen atom; a linear or branched alkyl group having 1 to 12 carbon atoms; a cycloalkyl group having 3 to 12 carbon atoms; a linear or branched alkoxy group having 1 to 12 carbon atoms; a linear or branched haloalkyl group having 1 to 12 carbon atoms substituted with at least one halogen atom, a halocycloalkyl group having 3 to 12 carbon atoms substituted with at least one halogen atom, a linear or branched haloalkoxy group having 1 to 12 carbon atoms substituted with at least one halogen atom; a substituted or unsubstituted aryl group having 6 to 24 carbon atoms or heteroaryl group having 4 to 24 carbon atoms (as the substituent, there is at least one substituent selected from a halogen atom, a hydroxyl group, a linear or branched alkyl group having 1 to 12 carbon atoms, a linear or branched alkoxy group having 1 to 12 carbon atoms, a linear or branched haloalkyl group having 1 to 12 carbon atoms substituted with at least one halogen atom, a linear or branched haloalkoxy group having 1 to 12 carbon atoms substituted with at least one halogen atom, a phenoxy group or naphthoxy group substituted with at least one linear or branched alkyl group or alkoxy group having 1 to 12 carbon atoms, a linear or branched alkenyl group having 2 to 12 carbon atoms, and an amino group); an aralkyl or heteroaralkyl group (linear or branched alkyl group having 1 to 4 carbon atoms is substituted with the aryl group or heteroaryl group); a substituted or unsubstituted phenoxy or naphthoxy group (as a substituent, there is at least one substituent selected from a linear or branched alkyl group or alkoxy group having 1 to 6 carbon atoms); —NH$_2$, —NHR, —CONH$_2$, or —CONHR (R is a linear or branched alkyl group having 1 to 6 carbon atoms); —OCOR$_8$ or —COOR$_8$ (here, R$_8$ is a linear or branched alkyl group having 1 to 6 carbon atoms or a cycloalkyl group having 3 to 6 carbon atoms or, in R$_1$ and R$_2$, a phenyl group substituted with at least one substituent of a substituted aryl or substituted heteroaryl group, or an unsubstituted phenyl group).

It is possible to form one or more aromatic ring groups or non-aromatic ring groups by bonding at least two adjacent R$_3$'s and including a carbon atom to which the R$_3$'s are bonded. An aromatic ring group or a non-aromatic ring group includes one ring or two annelated rings which optionally include a heteroatom selected from the group comprised of oxygen, sulfur, and nitrogen.

L is an integer of 0 to 2. m is an integer of 0 to 4.

In addition, examples of naphthopyran-based compounds include a compound in which a light adjusting dye molecule is added to at least one terminal of each of polysiloxane oligomers, polyalkylene oxides, and polyalkyl esters described in WO2013/78086, WO2012/149599, WO2010/020770, and WO2009/146509, or a compound including two or more naphthopyran rings in one molecule in which the structure indicated by General Formula (3) or General Formula (4) described above are bonded with a linking group, or the like.

Preferable examples of naphthopyran-based compounds represented by General Formula (3) include a compound represented by General Formula (5) (also referred to below as a compound (5)).

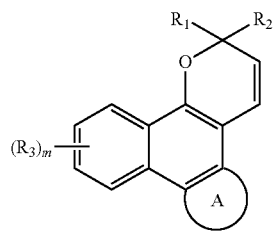

(5)

R$_1$, R$_2$, R$_3$, and m are the same as defined above, and A represents an annelated ring of formulas (A$_1$) to (A$_5$).

(A$_1$)

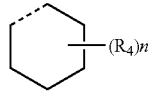

(A$_2$)

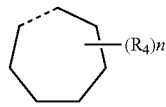

(A$_3$)

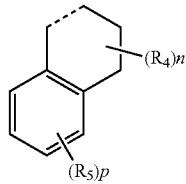

(A$_4$)

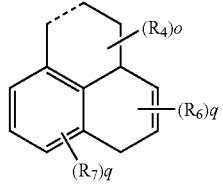

(A$_5$)

In these annelated rings (A$_1$) to (A$_5$), the dotted line represents the carbon C5 carbon and C6 bond of the naphthopyran ring of General Formula (5). The α bond of the annelated ring (A$_4$) or (A$_5$) is bonded to the carbon C$_5$ or carbon C$_6$ of the naphthopyran ring of General Formula (5).

R$_4$ are the same or different and independently represent OH, a linear or branched alkyl group or alkoxy group having 1 to 6 carbon atoms, or two R$_4$ form carbonyl (CO).

R$_5$, R$_6$, and R$_7$ independently represent a halogen atom (preferably fluorine, chlorine, or bromine); a linear or branched alkyl group having 1 to 12 carbon atoms (preferably a linear or branched alkyl group having 1 to 6 carbon atoms); a linear or branched haloalkyl group having 1 to 6 carbon atoms substituted with at least one halogen atom (preferably a fluoroalkyl group); a cycloalkyl group having 3 to 12 carbon atoms; a linear or branched alkoxy group having 1 to 6 carbon atoms; a substituted or unsubstituted phenyl or benzyl group (as a substituent, in a case where the R$_1$ and R$_2$ groups of General Formula (5) independently correspond to an aryl or heteroaryl group, there is at least one of the substituents described above in the definitions of the R$_1$ and R$_2$ groups); —NH$_2$, —NHR (here, R is a linear or branched alkyl group having 1 to 6 carbon atoms); a substituted or unsubstituted phenoxy or naphthoxy group (as a substituent, there is a linear or branched alkyl group or alkoxy group having at least 1 to 6 carbon atoms); —COR$_9$, —COOR$_9$, or —CONHR$_9$ group (here, R$_9$ represents a linear or branched alkyl group having 1 to 6 carbon atoms, a cycloalkyl group having 3 to 6 carbon atoms, or a substituted or unsubstituted phenyl or benzyl group (as the substituent, there is at least one of the substituents described above in the definitions of the R$_1$ and R$_2$ groups in a case where the R$_1$ and R$_2$ groups of General Formula (5) independently correspond to an aryl or heteroaryl group)).

n is an integer of 0 to 6, o is an integer of 0 to 2, p is an integer of 0 to 4, and q is an integer of 0 to 3.

Here, in a case where A indicates (A$_4$), n is an integer of 0 to 2, p is an integer of 0 to 4, and in a case where A indicates (A$_2$), n is an integer of 0 to 2.

The photochromic compound (C) of General Formula (5) is compatible with the color change reaction speeds to be applied in the required application and has high coloration suitability even at high temperatures of 40° C. or higher. Easily achievable colors range from orange to blue.

In the present embodiment, a mixture of compound (5) belonging to at least one different kind selected from a group comprised of the compound (5) in which $A=(A_1)$, the compound (5) in which $A=(A_2)$, the compound (5) in which $A=(A_3)$, the compound (5) in which $A=(A_4)$, and the compound (5) in which $A=(A_5)$ is also included.

In the present embodiment, it is possible to preferably use a compound represented by General Formula (6) as compound (5).

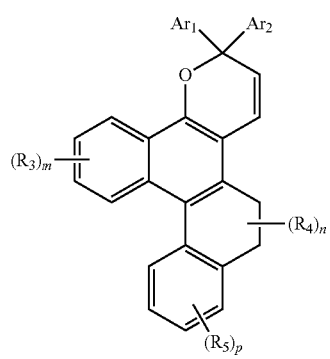

(6)

$Ar_1$ and $Ar_2$ are aromatic groups and these may be the same or different and represent a benzene ring or thiophene ring which optionally be substituted. Examples of substituents of the benzene ring or the thiophene ring include a linear or branched alkyl group having 1 to 10 carbon atoms, a linear or branched alkoxy group having 1 to 10 carbon atoms, or a linear or branched an alkyl mono (or di) substituted amino group having 1 to 6 carbon atoms. $R_3$, $R_4$, $R_5$, m, n, and p are as defined above.

As the compound (5), it is possible to more preferably use a compound represented by General Formula (7).

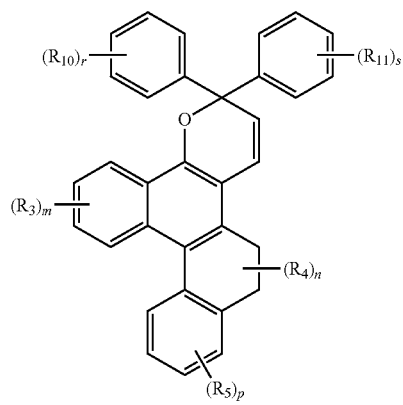

(7)

In Formula (7), $R_{10}$ and $R_{11}$ may be the same or different and represent a linear or branched alkyl group having 1 to 10 carbon atoms, a linear or branched alkoxy group having 1 to 10 carbon atoms, or a linear or branched alkyl mono (or di) substituted amino group having 1 to 6 carbon atoms. When m is 2, adjacent $R_3$'s are bonded to each other, and it is possible to form a ring structure including the carbon atom to which $R_3$ is bonded. r and s are integers from 0 to 4. The ring structure is a substituted or unsubstituted aryl group having 6 to 24 carbon atoms or a heteroaryl group having 3 to 24 carbon atoms.

$R_3$, $R_4$, $R_5$, m, n, and p are as defined above.

Specific examples of the compound indicated by General Formula (7) include compounds indicated by Formula (8) or Formula (9). In the present embodiment, the compounds indicated by Formula (8) and Formula (9) are preferable.

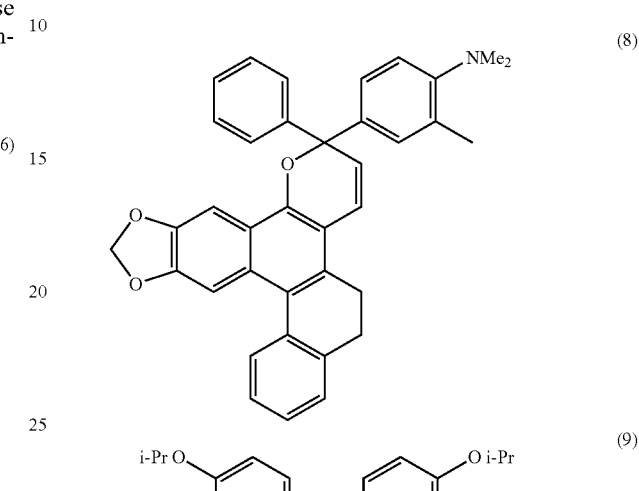

(8)

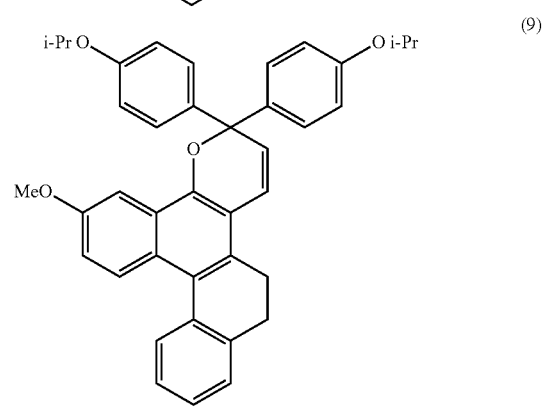

(9)

It is possible to synthesize the compound represented by General Formula (5) which is the photochromic compound (C) by a known method. For example, synthesis is also possible by the method described in JP-T-2004-500319.

In addition, specific examples of the naphthopyran-based compound represented by General Formula (3) include a compound represented by the following Formula (10) as a preferable example.

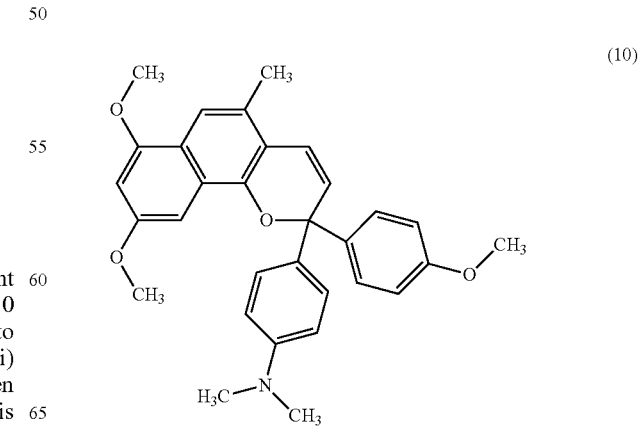

(10)

As the naphthopyran-based compound, one or two or more kinds of compounds selected from the compounds described above may be used.

It is possible for the polymerizable composition for an optical material of the present embodiment to include 100 to 3000 ppm of a naphthopyran-based compound with respect to 100% by weight in a total of the compound (A) and the compound (B), preferably 100 to 2000 ppm.

As the photochromic compound (C) in the present embodiment, it is also possible to use at least one kind selected from General Formula (a) and General Formula (b).

PC-L-Chain (a)

PC-L-Chain-L'-PC' (b)

PC and PC' indicate monovalent groups derived from the compounds of General Formulas (c) to (f). PC and PC' may be the same or different.

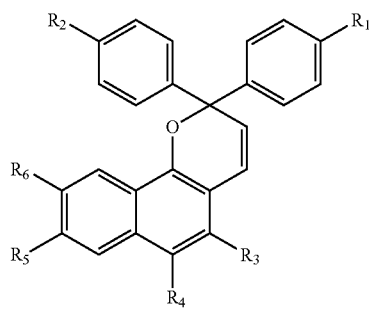
(c)

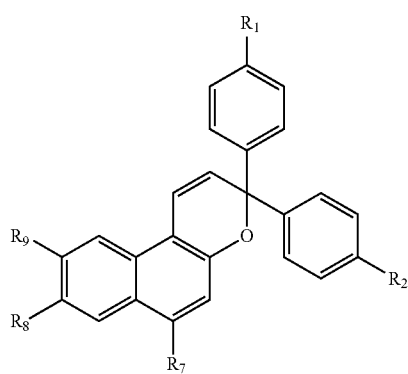
(d)

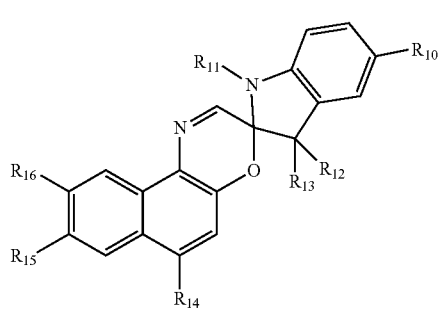
(e)

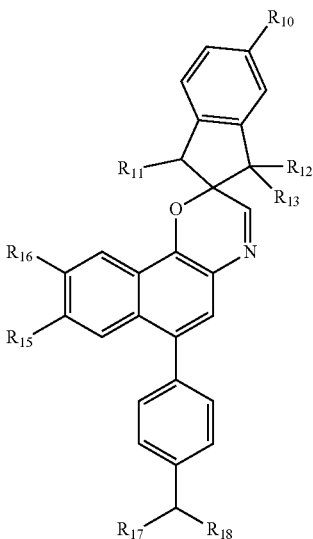
(f)

$R_1$ to $R_{18}$ in formulas (c) to (f) indicate hydrogen, a halogen atom, a carboxyl group, an acetyl group, a formyl group, an aliphatic group having 1 to 20 carbon atoms which optionally be substituted, an aliphatic group having 3 to 20 carbon atoms which optionally be substituted, or an aromatic organic group having 6 to 20 carbon atoms which optionally be substituted, which may be the same or different. The aliphatic group, alicyclic group, or aromatic organic group may include an oxygen atom and a nitrogen atom. Any one of the groups included in the compounds represented by General Formulas (c) to (f) is bonded to L or L' which is a divalent organic group.

Examples of the aliphatic group having 1 to 20 carbon atoms which optionally be substituted include a linear or branched alkyl group having 1 to 10 carbon atoms, a linear or branched alkoxy group having 1 to 10 carbon atoms, a linear or branched alkenyl group having 2 to 10 carbon atoms, hydroxyalkyl group having 1 to 10 carbon atoms, a hydroxyalkoxy group having 1 to 10 carbon atoms, an alkyl group having 1 to 10 carbon atoms substituted with an alkoxy group having 1 to 10 carbon atoms, an alkoxy group having 1 to 10 carbon atoms substituted with an alkoxy group having 1 to 10 carbon atoms, a haloalkyl group having 1 to 5 carbon atoms, a dihaloalkyl group having 1 to 5 carbon atoms, a trihaloalkyl group having 1 to 5 carbon atoms, an alkylamino group having 1 to 10 carbon atoms, an aminoalkyl group having 1 to 10 carbon atoms, a linear or branched alkoxycarbonyl group having 1 to 20 carbon atoms, and the like.

Examples of the alicyclic group having 3 to 20 carbon atoms which optionally be substituted include a cycloalkyl group having 3 to 20 carbon atoms, a bicycloalkyl group having 6 to 20 carbon atoms, and the like. Examples of the aromatic organic group having 6 to 20 carbon atoms which optionally be substituted include a phenyl group, an alkoxyphenyl group having 7 to 16 carbon atoms, an arylamino group, a diarylamino group, an aryl alkylamino group having 1 to 5 carbon atoms, a cyclic amino group, an arylcarbonyl group, an aroyl group, and the like.

Preferable examples of $R_1$ and $R_2$ include a hydrogen atom; a halogen atom; a linear or branched alkyl group having 1 to 10 carbon atoms, a linear or branched alkoxy group having 1 to 10 carbon atoms, a hydroxyalkoxy group having 1 to 10 carbon atoms, an alkoxy group having 1 to 10 carbon atoms substituted with an alkoxy group having 1 to 10 carbon atoms, an aliphatic group having 1 to 20 carbon atoms which optionally be substituted, such as a haloalkyl group having 1 to 5 carbon atoms, a dihaloalkyl group having 1 to 5 carbon atoms, a trihaloalkyl group having 1 to 5 carbon atoms, or an alkylamino group having 1 to 5 carbon atoms; an aromatic organic group having 6 to 20 carbon atoms which optionally be substituted, such as a phenyl group, an alkoxyphenyl group having 7 to 16 carbon atoms, a dialkylamino group having 1 to 5 carbon atoms, an arylamino group, a diarylamino group, an aryl alkylamino group having 1 to 5 carbon atoms, cyclic groups; and the like. $R_1$ and $R_2$ may be the same or different.

Preferable examples of $R_3$ include a hydrogen atom; a halogen atom; a carboxyl group; an acetyl group; an aliphatic group having 1 to 20 carbon atoms which optionally be substituted such as a linear or branched alkyl group having 1 to 10 carbon atoms, a linear or branched alkenyl group having 2 to 10 carbon atoms, a linear or branched alkoxy group having 1 to 10 carbon atoms, hydroxyalkyl group having 1 to 10 carbon atoms, an alkyl group having 1 to 10 carbon atoms substituted with an alkoxy group having 1 to 10 carbon atoms, an aminoalkyl group having 1 to 10 carbon atoms, or a linear or branched alkoxycarbonyl group having 1 to 20 carbon atoms; an alicyclic group having 3 to 20 carbon atoms which optionally be substituted such as a cycloalkyl group having 3 to 20 carbon atoms and a bicycloalkyl group having 6 to 20 carbon atoms; an aromatic organic group having 6 to 20 carbon atoms which optionally be substituted such as an arylcarbonyl group, a formyl group, or an aroyl group; and the like.

Preferable examples of $R_4$ include a hydrogen atom; a halogen atom; a carboxyl group; an acetyl group; a formyl group; an aliphatic group having 1 to 20 carbon atoms which optionally be substituted such as a linear or branched alkyl group having 1 to 10 carbon atoms, a linear or branched alkenyl group having 2 to 10 carbon atoms, a linear or branched alkoxy group having 1 to 10 carbon atoms, hydroxyalkyl group having 1 to 10 carbon atoms, an alkyl group having 1 to 10 carbon atoms substituted with alkoxy group having 1 to 10 carbon atoms, an aminoalkyl group having 1 to 10 carbon atoms, or a linear or branched alkoxycarbonyl group having 1 to 20 carbon atoms; an alicyclic group having 3 to 20 carbon atoms which optionally be substituted such as a cycloalkyl group having 3 to 20 carbon atoms and a bicycloalkyl group having 6 to 20 carbon atoms; an aromatic organic group having 6 to 20 carbon atoms which optionally be substituted such as an allylcarbonyl group, an aroyl group, a phenyl group, an alkoxyphenyl group having 7 to 16 carbon atoms, a dialkoxyphenyl group having 1 to 10 carbon atoms, an alkylphenyl group having 1 to 10 carbon atoms, a dialkylphenyl group having 1 to 10 carbon atoms; and the like.

$R_3$ and $R_4$ may be bonded to each other. In a case where $R_3$ and $R_4$ are bonded to each other to form a cyclic structure, examples thereof include General Formula (g) or (h). The dotted line portion represents the bond between the carbon atom to which $R_3$ is bonded and the carbon atom to which $R_4$ is bonded.

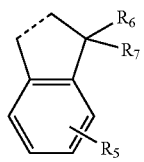

(g)

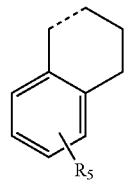

(h)

$R^5$, $R^6$, $R^7$, $R^8$, $R^9$, $R^{10}$, $R^{14}$, $R^{15}$, and $R^{16}$ indicate the same functional groups as $R^1$ and $R^2$. The plurality of $R^5$ to $R^7$ may be the same or different.

Preferable examples of $R^{11}$ include a hydrogen atom; a halogen atom; an aliphatic group having 1 to 20 carbon atoms which optionally be substituted such as a linear or branched alkyl group having 1 to 20 carbon atoms, a haloalkyl group having 1 to 5 carbon atoms, a dihaloalkyl group having 1 to 5 carbon atoms, or a trihaloalkyl group having 1 to 5 carbon atoms; an alicyclic group having 3 to 20 carbon atoms which optionally be substituted such as a cycloalkyl group having 3 to 20 carbon atoms, a bicycloalkyl group having 6 to 20 carbon atoms, a cycloalkyl group having 3 to 20 carbon atoms substituted with an alkyl group having 1 to 5 carbon atoms, or a bicycloalkyl group having 6 to 20 carbon atoms substituted with an alkyl group having 1 to 5 carbon atoms; an aromatic organic group having 6 to 20 carbon atoms which optionally be substituted such as an aryl group substituted with an alkyl group having 1 to 5 carbon atoms; and the like.

$R^{12}$ and $R^{13}$ preferably indicate a hydrogen atom; a halogen atom; an aliphatic group having 1 to 20 carbon atoms which optionally be substituted such as an alkyl group having 1 to 10 carbon atoms or an alkyl alkoxycarbonyl group having 1 to 5 carbon atoms; an alicyclic group having 3 to 20 carbon atoms which optionally be substituted such as a cycloalkyl group having 5 to 7 carbon atoms; and the like.

$R^{17}$ and $R^{18}$ preferably indicate a hydrogen atom; a halogen atom; an aliphatic group having 1 to 20 carbon atoms which optionally be substituted such as a linear or branched alkyl group having 1 to 10 carbon atoms and hydroxyalkyl group having 1 to 10 carbon atoms; an alicyclic group having 3 to 20 carbon atoms which optionally be substituted such as a cycloalkyl group having 5 to 7 carbon atoms, and the like.

L and L' in General Formula (a) or (b) indicate a divalent organic group including one kind or more selected from an oxyethylene chain, an oxypropylene chain, a (thio) ester group, and a (thio)amido group.

Specifically, L and L' are represented by General Formulas (i) to (o). L and L' may be the same or different.

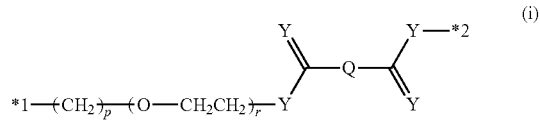

(i)

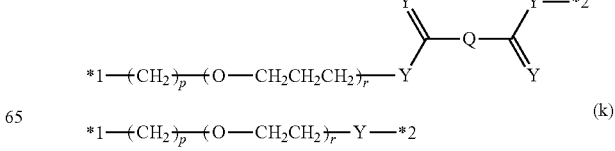

(j)

(k)

$$*1-(CH_2)_p-(O-CH_2CH_2CH_2)_r-Y-*2 \quad (l)$$

$$*1-(CH_2)_p-N(R_{19})-C(=Y)-Q-C(=Y)-Y-*2 \quad (m)$$

$$*1-R_{20}-N(R_{19})-C(=Y)-Q-C(=Y)-Y \quad (n)$$

$$*1-(CH_2)_p-C(=Y)-Y-*2 \quad (o)$$

In formulas (i) to (o),

Y represents oxygen or sulfur. $R^{19}$ indicates hydrogen or a linear or branched alkyl group having 1 to 10 carbon atoms. $R^{20}$ indicates a linear or branched alkyl group having 1 to 10 carbon atoms. p indicates an integer of 0 to 15, and r indicates an integer of 0 to 10. Q indicates a linear or branched alkylene group having 1 to 10 carbon atoms, an alkenylene group having 1 to 10 carbon atoms, a divalent group derived from a substituted aryl group at the 1,2-, 1,3-, or 1,4-position, a divalent group derived from a substituted heteroaryl group, and the like. *1 and *2 represent α bond, *1 bonds to a monovalent or divalent organic group represented by "Chain", and *2 bonds to a monovalent organic group represented by PC or PC'.

"Chain" in General Formula (a) or (b) indicates a monovalent or divalent organic group including at least one kind selected from a polysiloxane chain and a polyoxyalkylene chain.

Examples of polysiloxane chains include polydimethylsiloxane chain, polymethylphenylsiloxane chain, polymethylhydrosiloxane chain, and the like.

Examples of polyoxyalkylene chains include a polyoxyethylene chain, a polyoxypropylene chain, a polyoxyhexamethylene chain, and the like.

Specifically, "Chain" indicates a monovalent organic group of General Formula (p) or (q) in a case where the photochromic compound is General Formula (a).

$$*3-Si(R_{21})(R_{21})-O-[Si(R_{21})(R_{21})-O]_n-Si(R_{21})(R_{21})-R_{22} \quad (p)$$

$$*3-[(\phantom{x})_q-O]_m-(\phantom{x})_q-R_{22} \text{ with } R_{23} \quad (q)$$

"Chain" indicates a divalent organic group of General Formula (r) or (s) in a case where the photochromic compound is General Formula (b).

$$*3-Si(R_{21})(R_{21})-O-[Si(R_{21})(R_{21})-O]_n-Si(R_{21})(R_{21})-*4 \quad (r)$$

$$*3-[(\phantom{x})_q-O]_m-(\phantom{x})_q-*4 \text{ with } R_{23} \quad (s)$$

In formulas (p) to (s), $R_{21}$ represents a linear or branched alkyl group having 1 to 10 carbon atoms. $R_{22}$ represents a linear or branched alkyl group having 1 to 10 carbon atoms. $R_{23}$ represents hydrogen, a methyl group, or an ethyl group. n represents an integer of 4 to 75, and m represents an integer of 1 to 50. q represents an integer of 1 to 3. *3 and *4 represent α bond, *3 bonds to a divalent organic group represented by L, and *4 bonds to a divalent organic group represented by L'.

As the photochromic compound (C), from the viewpoint of improving the coloring speed and lowering the transmittance during coloring, for example, it is possible to produce a lens with better photochromic property by selecting the compound of General Formula (b).

In addition, the photochromic compound (C) is also preferably a combination of the photochromic compounds of General Formula (a), a combination of the photochromic compounds of General Formula (b), a combination of the photochromic compounds of General Formula (a), and the photochromic compound of General Formula (b), more preferably a combination of photochromic compounds of General Formula (b), and even more preferably a combination of photochromic compounds of General Formula (b) in which PC and PC' are of General Formula (c), Chain is of General Formula (r) or (s), and L and L' are one of General Formulas (i), (j), and (o). It is possible to combine the two kinds of photochromic compounds in a ratio of 1:9 to 9:1, and preferably 2:8 to 8:2.

In the polymerizable composition for an optical material of the present embodiment, it is possible to include 100 to 3000 ppm of the photochromic compound represented by General Formula (a) or General Formula (b) with respect to a total of 100% by weight of the compound (A) and the compound (B), and preferably 100 to 2000 ppm.

It is possible to obtain the photochromic compound of the present invention by the methods described in WO 2009/146509, WO 2010/20770, WO 2012/149599, and WO 2012/162725.

Examples of the photochromic compound (C) in the present embodiment include Reversacol Humber Blue of Vivimed Co., Ltd. (polydimethylsiloxane chain, naphthopyran type chromophore (General Formula (c)), Reversacol Calder Blue (polydimethylsiloxane chain, naphthopyran type chromophore (General Formula (c)), Reversacol Trent Blue (polydimethylsiloxane chain, naphthopyran type chromophore (General Formula (c)), Reversacol Pennine Green (polydimethylsiloxane chain, naphthopyran type chromophore (General Formula (c)), Reversacol Heath Green (polyoxyalkylene chain, naphthopyran type chromophore (General Formula (c)), Reversacol Chilli Red (polydimethylsiloxane chain, naphthopyran type chromophore (General Formula (c)), Reversacol Wembley Grey (polyoxyalkylene chain, naphthopyran type chromophore (General Formula (c)), Reversacol Cayenne Red (polyoxyalkylene chain, naphthopyran type chromophore (General Formula (c))), Reversacol Wilson Blue (polyoxyalkylene chain, naphthopyran type chromophore (General Formula (c))), and the like.

These compounds are preferably used for the photochromic compound (C) from the viewpoint of coloring speed.

[(D) Radical Polymerization Initiator]

It is possible for the polymerizable composition for an optical material of the present embodiment to further include a radical polymerization initiator (D). In the present embodiment, it is possible for the radical polymerization initiator (D) to include at least one kind selected from the following radical polymerization initiator (D1) and the following radical polymerization initiator (D2).

The radical polymerization initiator (D1) has a radical residual ratio after 5 hours at 50° C. of 20% or more and less than 100% and a radical residual ratio after 5 hours at 70° C. of 0% or more and less than 30%. The radical polymerization initiator (D2) has a radical residual ratio of 30% or more and less than 100% after 5 hours at 70° C.

It is possible to calculate the radical residual ratio of the radical polymerization initiator as follows.

A thermal decomposition rate $k_d$ of the radical polymerization initiator at a predetermined temperature T is calculated by the following equation.

$$k_d = A\exp(-\Delta E/RT)$$

A: Frequency factor
ΔE: Activation energy
R: Gas constant (8.314 J/mol K)
T: Absolute temperature (T)

Using the thermal decomposition rate kd, it is possible to calculate the radical residual ratio of the radical polymerization initiator after the reaction for t hours at the predetermined temperature T.

$$\text{Radical residual ratio(\%)} = \exp(-k_d t) \times 100$$

t: Time (hr)

The radical polymerization initiator (D1) has a radical residual ratio after 5 hours at 50° C. of 20% or more and less than 100%, preferably 20% or more and 90% or less, more preferably 40% or more and 85% or less, and a radical residual ratio after 5 hours at 70° C. of 0% or more and less than 30%, preferably 0% or more and 20% or less, and more preferably 0% or more and 10% or less.

The radical polymerization initiator (D2) has a residual radical ratio after 5 hours at 70° C. of 30% or more and less than 100%, and preferably 40% or more and less than 100%.

It is possible to appropriately combine the above ranges.

Examples of the radical polymerization initiator (D1) include a peroxyester-based radical polymerization initiator, a peroxydicarbonate-based radical polymerization initiator, an azo-based radical polymerization initiator, and the like, and it is possible to use at least one kind. In the following, the numerical values in parentheses indicate "radical residual ratio after 5 hours at 50° C.", and "radical residual ratio after 5 hours at 70° C." in order.

Examples of peroxyester-based radical polymerization initiators include t-butylperoxyneodecanoate (57.6%, 0.2%), t-hexylperoxypivalate (80.2%, 5.5%), t-hexylperoxyneodecanoate, 1,1,3,3-tetramethylbutylperoxyneodecanoate (27.9%, 0.0%), t-butylperoxypivalate (82.6%, 7.9%), and the like.

Examples of peroxydicarbonate-based radical polymerization initiators include diisopropylperoxydicarbonate (24.8%, 0%), di-n-propylperoxydicarbonate (28.7%, 0%), bis(4-t-butylcyclohexyl) peroxydicarbonate (28.2%, 0%), di-2-ethylhexylperoxydicarbonate (40.4%, 0%), di-sec-butylperoxydicarbonate (29.4%, 0%), and the like.

Examples of (azo)-based radical polymerization initiators include 2-2'-azobis(2,4-dimethylvaleronitrile) (73.8%, 2.0%).

Examples of the radical polymerization initiator (D2) include a peroxyester-based radical polymerization initiator, a peroxyketal-based radical polymerization initiator, a peroxycarbonate-based radical polymerization initiator, an azo-based radical polymerization initiator, and the like, and it is possible to use at least one kind. In the following, numerical values in parentheses indicate "radical residual ratio after 5 hours at 70° C."

Examples of peroxyester-based radical polymerization initiators include 1,1,3,3-tetramethylbutylperoxy-2-ethylhexanoate (53.8%), t-butylperoxy 2-ethylhexanoate (76.8%), t-amylperoxy-2-ethylhexanoate (78.5%), t-hexylperoxy 2-ethylhexanoate (70.9%), 1-cyclohexyl-1-methylethylperoxyneodecanoate, t-butylperoxylaurate (99.2%), t-butylperoxynonanoate, t-butylperoxyisobutyrate (92.4%), t-butylperoxy-3,3,5-trimethylhexanoate (98.7%), t-butylperoxyacetate (99.6%), t-butylperoxyiso (99.4%), t-butylperoxybenzoate (99.6%), t-amylperoxynormo octoate (98.9%), t-amylperoxyacetate (99.3%), t-amylperoxyisononate (98.9%), t-amylperoxybenzoate (99.2%), t-hexylperoxybenzoate (99.3%), and the like.

Examples of peroxyketal-based radical polymerization initiators include 1,1-di(t-amylperoxy) cyclohexane (98.6%), 1,1-di(t-hexylperoxy) cyclohexane (96.2%), 1,1-di(t-butylperoxy) cyclohexane (97.5%), n-butyl-4,4-di(t-butylperoxy) valerate (99.8%), 2,2-(bis(4,4-di-t-butylperoxycyclohexyl) propane, 2,2-di(t-butylperoxy) butane (99.7%), ethyl-3,3-di(t-butylperoxy) butyrate (99.9%), and the like.

Examples of peroxycarbonate-based radical polymerization initiators include t-butylperoxyisopropyl carbonate (99.3%), t-butylperoxy-2-ethylhexyl carbonate (99.2%), t-amylperoxyisopropyl carbonate 99.1%), t-amylperoxy-2-ethylhexyl carbonate (99.2%), and the like.

Examples of (azo)-based radical polymerization initiators include 2,2'-azobis(isobutyronitrile) (50.2%), 2-2'-azobis(2-methylbutyronitrile) (60.0%), 1,1'-azobis(cyclohexane-1-carbonitrile) (97.7%), and the like.

The addition amount of the radical polymerization initiator (D) varies according to the polymerization conditions, the kind of the initiator, and the composition of the monomer, and is not able to be unconditionally limited, but is preferably in a range of 0.01 to 10 parts by weight with respect to 100 parts by weight of the polymerizable composition, and preferably 0.1 to 5 parts by weight. If the addition amount is less than 0.01 part by weight, curing becomes insufficient, and if the addition amount exceeds 10 parts by weight, the molded product tends to be distorted.

As the radical polymerization initiator (D), it is also possible to use either of the radical polymerization initiator (D1) or (D2) alone, or to use (D1) and (D2) in combination. In a case where the radical polymerization initiator (D1) or (D2) is used alone, the included amount is 0.01 parts by weight or more and 10 parts by weight or less with respect to 100 parts by weight of the polymerizable composition, and preferably 0.1 parts by weight or more and 5 parts by weight or less. From the viewpoint of the effect of the present invention, in a case of a combination of the radical polymerization initiators (D1) and (D2), it is possible to include 0.1 part by weight or more and 5.0 parts by weight or less of the polymerization initiator (D1) with respect to 100 parts by weight of the polymerizable composition, and preferably 0.2 part by weight or more and 3.0 parts by weight or less, and to include more than 0 parts by weight and 1.0 part by weight or less of the polymerization initiator (D2), and preferably 0.001 part by weight or more and 0.5 parts by weight or less. It is possible to appropriately combine the above ranges.

When curing the monomer composition using the radical polymerization initiators (D1) and/or (D2), the decomposition of additives such as photochromic compounds and ultraviolet absorbers at the time of curing is prevented and it is possible to suppress coloration during the curing.

In the present embodiment, the radical polymerization initiator (D) preferably includes (D1) alone or a combination of (D1) and (D2), and more preferably includes a combination of (D1) and (D2).

In the present embodiment, by including the radical polymerization initiator (D1) and the radical polymerization initiator (D2), (D1) easily generates radicals at a lower temperature side and (D2) easily generates radicals at a higher temperature side, thus, radicals remain in the system at a certain concentration or more during polymerization, therefore, cracking, polymeric peeling, and the like of the lenses are particularly suppressed and the formability is improved, such that the yield of products is greatly improved.

In the present embodiment, using the allyl carbonate compound (A), the (meth)acrylate compound (B), the photochromic compound (C), and the combination of the radical polymerization initiators (D1) and (D2) makes it possible to provide a photochromic lens for spectacles which has both an excellent surface hardness and photochromic property without impairing transparency and, since cracking, polymeric peeling, and the like of the lenses are particularly suppressed during polymerization and the formability is excellent, the yield of the product is greatly improved.

The polymerization initiator (D) is preferably a combination of the following compound which is the radical polymerization initiator (D1) and the following compound which is the radical polymerization initiator (D2).

(1) A combination of t-butylperoxyneodecanoate and 1,1,3,3-tetramethylbutylperoxy-2-ethylhexanoate (2) A combination of t-butylperoxyneodecanoate and t-amylperoxy-2-ethylhexanoate In order to cure the polymerizable composition for an optical material of the present embodiment, the radical polymerization initiator (D) is added to the monomer composition, after which it is possible to carry out the curing by a heat curing method or an active energy ray curing method.

[Other Components]

In the present embodiment, in addition to the above components (A) to (D), an ultraviolet absorber, a resin modifier, an internal release agent, and the like may be further included.

Examples of ultraviolet absorbers include benzotriazole-based ultraviolet absorbers, triazine-based ultraviolet absorbers, benzophenone-based ultraviolet absorbers, cyanoacrylate-based ultraviolet absorbers, diphenyl acrylate-based ultraviolet absorbers, phenol-based ultraviolet absorbers, oxaanilide-based ultraviolet absorbers, and malonic ester-based ultraviolet absorbers.

The amount of the ultraviolet absorber to be added is not able to be unconditionally limited since the ultraviolet region to be absorbed varies depending on the kind of the ultraviolet absorber; however, the amount is in a range of 0.01 to 5 parts by weight with respect to 100 parts by weight of the polymerizable composition, and preferably 0.02 to 2 parts by weight.

As the resin modifier, a radical polymerizable monomer other than the (meth)acrylate compound (B) may be added in a range in which the effect of the present invention is not impaired.

As specific examples of the radically polymerizable monomer other than the (meth)acrylate compound (B), it is possible to use one kind or two or more kinds of compounds selected from the group comprised of styrene, alphamethylstyrene, alphamethylstyrene dimer, benzyl methacrylate, chlorostyrene, bromostyrene, methoxystyrene, monobenzylfumarate, dibenzyl fumarate, dibutylfumarate, monopentyl fumarate, and dipentyl fumarate.

<Method for Producing Polymerizable Composition for Optical Material>

The polymerizable composition for an optical material of the present embodiment is obtained by mixing an allyl carbonate compound (A), a (meth)acrylate compound (B), a photochromic compound (C) and, as necessary, a radical polymerization initiator (D).

As a mixing method, it is also possible to carry out batch mixing, or prepare the compound (A) and the compound (B) (master batch) containing the photochromic compound (C) and, as necessary, the radical polymerization initiator (D) at high concentration as one batch, and to prepare this master batch by dilution and mixing in the compound (A) and the compound (B). In a case of using a master batch, the dilution ratio of the master batch varies according to the photochromic compound, but is usually 2 times or more and 50 times or less, preferably 4 times or more and 20 times or less, and more preferably 5 times or more and 15 times or less. In this range, since the photochromic compound (C) is uniformly dispersed, suitable use is possible.

The temperature in a case where the polymerizable composition is prepared by mixing the compound (A), the compound (B), the compound (C), the radical polymerization initiator (D), and the ultraviolet absorber is usually 40° C. or lower, and preferably 30° C. or lower. From the viewpoint of the pot life of the polymerizable composition, it may be preferable to further lower the temperature. However, in a case where the solubility of the catalyst and additives in the monomer is not good, it is also possible to dissolve the catalyst and additives in the monomer and the resin modifier in advance by warming.

In the present embodiment, the method for producing the resin molded product is not particularly limited, but examples of preferable production methods include cast polymerization. First, a polymerizable composition is injected to a space between molds held by a gasket, a tape, or the like. At this time, depending on the physical properties required for the plastic lens to be obtained, in many cases, it is preferable to carry out defoaming treatment under reduced pressure, a filtration treatment such as pressurization and depressurization, and the like as necessary.

Since the polymerization conditions vary greatly depending on the composition of the polymerizable composition, the kind and amount of the catalyst used, the shape of the mold, and the like, the conditions are not limited, but the above are performed for approximately 1 to 50 hours at a temperature of 50 to 150° C. In some cases, it is preferable to carry out the curing while holding or gradually raising the temperature in a temperature range of 10 to 150° C. for 1 to 48 hours.

The resin molded product may be subjected to a treatment such as annealing as necessary. The treatment temperature is usually performed at 50 to 150° C., but is preferably performed at 90 to 140° C., and more preferably performed at 100 to 130° C.

In the present embodiment, when molding the resin, in addition to the above-mentioned "other components", in accordance with the purpose, in the same manner as known molding methods, various additives such as a chain extender, a cross-linking agent, a radical scavenger, a light stabilizer, an ultraviolet stabilizer, an antioxidant, a bluing agent, an oil soluble dye, a filler, an adhesion improver, an antimicrobial agent, an antistatic agent, and the like may be added.

<Use>

It is possible to obtain the resin of the present embodiment as a molded product of various shapes by changing the type of mold at the time of cast polymerization.

Since it is possible for the molded product obtained from the polymerizable composition for an optical material of the present embodiment to obtain a material having both excellent surface hardness and photochromic property without impairing transparency, use is possible for various optical materials such as a plastic lens. In particular, it is possible to suitably use the molded product as a plastic spectacle lens or a plastic polarized lens.

[Plastic Spectacle Lens]

The plastic spectacle lens using the lens base material comprised of the molded product of the present embodiment may be used after application of a coating layer on one surface or both surfaces thereof as necessary.

The plastic spectacle lens of the present embodiment is comprised of a lens base material comprised of the polymerizable composition described above and a coating layer.

Specific examples of the coating layer include a primer layer, a hard coat layer, an anti-reflection layer, an anti-fog coating layer, an anti-fouling layer, a water repellent layer, and the like. It is also possible to use each of these coating layers alone, or to use a plurality of coating layers in multiple layers. In a case of applying coating layers on both surfaces, the same coating layer may be applied to each side or different coating layers may be applied to each side.

In each of these coating layers, an infrared absorber for the purpose of protecting eyes from infrared rays, a light stabilizer, an antioxidant, and a photochromic compound for the purpose of improving the weather resistance of the lens, and a dye or a pigment for the purpose of improving the fashionability of the lens, an antistatic agent, and other known additives for improving the performance of the lens may be used in combination.

Various leveling agents for the purpose of improving applicability may be used for layers to be coated by application.

The primer layer is usually formed between a hard coat layer described below and a lens. The primer layer is a coating layer for the purpose of improving the adhesion between the hard coat layer formed thereon and the lens, and in some cases, it is also possible to improve the impact resistance. It is possible to use any material as the primer layer as long as the material has high adhesion to the obtained lens, but in general, a primer composition mainly comprised of a urethane-based resin, an epoxy-based resin, a polyester-based resin, a melanin-based resin, a polyvinyl acetal, or the like is used. The primer composition may be used with an appropriate solvent which does not affect the lens, for the purpose of adjusting the viscosity of the composition. Naturally, the primer composition may be used without a solvent.

It is also possible to form the primer layer by either method of a coating method or a dry method. In a case of using a coating method, a primer layer is formed by coating the primer composition to a lens by a known coating method such as spin coating, dip coating, or the like and then solidifying the primer composition. In a case where the drying method is used, the primer layer is formed by a known dry method such as a CVD method or a vacuum deposition method. When forming the primer layer, the surface of the lens may be subjected to a pretreatment such as an alkali treatment, a plasma treatment, an ultraviolet treatment, and the like as necessary for the purpose of improving the adhesion.

The hard coat layer is a coating layer for the purpose of imparting functions such as scratch resistance, abrasion resistance, moisture resistance, hot water resistance, heat resistance, weather resistance, and the like to the lens surface.

Generally, for the hard coat layer, a hard coat composition including an organosilicon compound having curability and one or more kinds of oxide fine particles of elements selected from the element group of Si, Al, Sn, Sb, Ta, Ce, La, Fe, Zn, W, Zr, In, and Ti and/or one kind or more of fine particles comprised of composite oxides of two or more kinds of elements selected from this group of elements is used.

In addition to the above components, it is preferable for the hard coat composition to include at least one of amines, amino acids, metal acetylacetonate complexes, metal salts of organic acids, perchloric acids, salts of perchloric acids, acids, metal chlorides, and polyfunctional epoxy compounds. The hard coat composition may be used with an appropriate solvent which does not affect the lens or may be used without a solvent.

The hard coat layer is usually formed by coating a hard coat composition by a known coating method such as spin coating or dip coating and then curing the composition. Examples of curing methods include heat curing, curing methods using energy ray irradiation such as ultraviolet rays or visible light, and the like. In order to suppress the occurrence of interference fringes, it is preferable that the difference in refractive index of the hard coat layer and the lens be within a range of ±0.1.

The antireflection layer is usually formed on the hard coat layer as necessary. There are organic type and inorganic type antireflection layers and, in the case of an inorganic type, inorganic oxides such as $SiO_2$ and $TiO_2$ are used, and the antireflection layer is formed by a dry method such as a vacuum deposition method, a sputtering method, an ion plating method, an ion beam assist method, or a CVD method. In the case of an organic type, the antireflection layer is formed by a wet process using an organosilicon compound and a composition including silica-based fine particles having an internal cavity.

There are single layer and multiple-layer antireflection layers, and in the case of use as a single layer, it is preferable that the refractive index be lower than the refractive index of the hard coat layer by at least 0.1. In order to effectively exhibit the antireflection function, it is preferable to form a multilayer antireflection film, in which case a low refractive index film and a high refractive index film are alternately stacked. Also in this case, the refractive index difference between the low refractive index film and the high refractive index film is preferably 0.1 or more. Examples of high refractive index films include films of ZnO, $TiO_2$, $CeO_2$, $Sb_2O_5$, $SnO_2$, $ZrO_2$, $Ta_2O_5$, and the like, and examples of low refractive index films include $SiO_2$ films and the like.

On the antireflection layer, an antifogging layer, an antifouling layer, a water repellent layer may be formed, as necessary. The method for forming the antifogging layer, the antifouling layer, and the water repellent layer is not particularly limited as long as there is no adverse effect on the antireflection function, the processing method, the processing material, and the like are not particularly limited and it is possible to use known antifogging treatment methods, antifouling treatment methods, water repellent treatment methods, and materials. Examples of antifogging treatment methods and antifouling treatment methods include a method of covering the surface with a surfactant, a method of adding a hydrophilic film to the surface to impart water absorbency, a method of covering the surface with fine irregularities to increase the water absorbency, a method of using photocatalytic activity to impart water absorbency, a method of carrying out a super water repellent treatment to prevent adhesion of water droplets, and the like. In addition, examples of water repellent treatment methods include a method of forming a water repellent treated layer by vapor deposition or sputtering of a fluorine-containing silane compound or the like, a method of dissolving the fluorine-containing silane compound in a solvent, followed by coating to form a water repellent treated layer, and the like.

[Plastic Polarized Lens]

The plastic polarized lens of the present embodiment includes a polarizing film, and a base material layer formed on at least one surface of the polarizing film and comprised of the molded product obtained by curing the polymerizable composition for an optical material of the present embodiment.

It is possible to form the polarizing film in the present embodiment of a thermoplastic resin. Examples of thermoplastic resins include polyester resin, polycarbonate resin, polyolefin resin, polyimide resin, polyvinyl alcohol resin, polyvinyl chloride resin, and the like. From the viewpoints of water resistance, heat resistance, and molding processability, polyester resins and polycarbonate resins are preferable, and polyester resins are more preferable.

Examples of polyester resins include polyethylene terephthalate, polyethylene naphthalate, polybutylene terephthalate, and the like, and from the viewpoints of water resistance, heat resistance, and molding processability, polyethylene terephthalate is preferable.

Specific examples of polarizing films include a polyester polarizing film containing a dichroic dye, a polyvinyl alcohol polarizing film containing iodine, a polyvinyl alcohol polarizing film containing a dichroic dye, and the like.

The polarizing film may be used after being subjected to heat treatment for drying and stabilization.

Furthermore, in order to improve the adhesion to the acrylic-based resin, the polarizing film may be used after performing one kind or two or more kinds of pretreatment selected from a primer coating treatment, a chemical treatment (gas or chemical liquid treatment such as an alkali), a corona discharge treatment, a plasma treatment, an ultraviolet irradiation treatment, an electron beam irradiation treatment, a surface roughening treatment, a flame treatment, and the like. Among such pretreatments, one kind or two or more kinds selected from a primer coating treatment, a chemical treatment, a corona discharge treatment, and a plasma treatment are particularly preferable.

In the plastic polarized lens of the present embodiment, a base material layer obtained by curing the polymerizable composition for an optical material of the present embodiment is stacked on one surface of the objective surface side or the spectacle surface side of the polarizing film or on both surfaces of the objective surface side and the spectacle surface side.

From the viewpoint of the photochromic property, the base material layer obtained by curing the polymerizable composition for an optical material of the present embodiment is preferably stacked on at least the surface on the objective surface side of the polarizing film. In a case where the base material layer in the present embodiment is formed only on the surface on the objective surface side of the polarizing film, it is possible to form the base material layer, which is formed on the other surface of the polarizing film, of the polymerizable composition for an optical material of the present embodiment which does not include the component (C) or the components (C) and (D), and also to form the base material layer of a plastic material such as acrylic resin, allyl carbonate resin, polycarbonate resin, polyurethane resin, polythiourethane resin, and polysulfide resin.

The plastic polarized lens of the present embodiment is not particularly limited, but examples thereof include a method of attaching a lens base material on both surfaces of a polarizing film, a method of carrying out polymerization casting on a polymerizable composition on both surfaces of a polarizing film, and the like. In the present embodiment, a description will be given of an example formed by a cast polymerization method.

The method of producing the plastic polarized lens of the present embodiment is, for example, a step of forming a first polymerizable composition layer on the surface located at the objective surface side of the polarizing film and forming a second polymerizable composition layer on the other surface of the polarizing film in a mold, and a step of polymerizing and curing the polymerizable composition layer to stack the base material layer on both surfaces of the polarizing film.

The first polymerizable composition layer is formed from the polymerizable composition for an optical material of the present embodiment. In a case where the layer of the first polymerizable composition and the layer of the second polymerizable composition have the same resin composition, since temperature control and the like in the polymerization step is easy, the layer of the second polymerizable composition is comprised of the polymerizable composition for an optical material of the present embodiment which does not include the (C) and (D) components.

A lens casting mold is generally comprised of two substantially disc-shaped glass molds held by a gasket. In the space of this lens casting mold, a polarizing film is installed such that the film surface is parallel to the mold inner surface of the front side opposite to the film surface. A gap is formed between the polarizing film and the mold. The polarizing film may be pre-formed.

Then, it is possible to inject a first polymerizable composition between the mold and a surface on the objective surface side of the polarizing film to form the layer of the first polymerizable composition, and then inject the second polymerizable composition into the gap between the surface on the spectacles side of the polarizing film and the mold to form the layer of the second polymerizable composition.

In addition, it is also possible to perform this step by placing the first polymerizable composition on the forming surface for forming the objective surface of the lens of the mold, spreading the first polymerizable composition over the entire surface of the forming surface on the polarizing film, separating the mold and the surface on the objective surface side of the polarizing film by a predetermined distance via the layer comprised of the first polymerizable composition and then injecting the second polymerizable composition into the gap between the polarizing film and the forming surface of the mold for forming the spectacle surface of the lens and forming the layer of the second polymerizable composition.

The polymerization conditions of the polymerizable composition vary according to the composition of the polymerizable composition, the kind and amount of the catalyst used, the shape of the mold, and the like, but the polymerization is performed at a temperature of 5 to 140° C. for 1 to 50 hours. In some cases, it is preferable to hold or gradually raise the temperature in a temperature range of 5 to 130° C. to carry out the curing in 1 to 25 hours.

Releasing the stack cured by polymerization from the mold makes it possible to obtain the plastic polarized lens of the present embodiment.

In the present embodiment, the stack after polymerization/release may be subjected to a heat treatment such as annealing as necessary. From the viewpoint of the effect of the present invention, the treatment is performed at a temperature of between 90 to 150° C., preferably at 110 to 130° C., and more preferably at 115 to 125° C. From the viewpoint of the effect of the present invention, the treatment time is in the range of 1 to 10 hours, and preferably 2 to 5 hours.

The same coating layer as the plastic spectacle lens may be formed on the surface of the obtained base material layer.

EXAMPLES

Next, a more detailed description will be given of the present invention with reference to Examples, but the present invention is not limited by these Examples at all. In the Examples and Comparative Examples, the methods used for evaluation and the apparatuses used are as follows.

Refractive index (ne) Abbe number (ve): Measurement was performed at 20° C. using a refractometer KPR-20 (manufactured by Kalnew Optical Industries, Ltd.).

Transparency: A molded product processed to a thickness of 9 mm was irradiated using a projector in a dark place and the presence or absence of cloudiness and foreign matter was judged visually. A molded product in which cloudiness and foreign matter were not confirmed was "good" (transparent), and a molded product in which these were confirmed was "poor" (not transparent).

Rockwell hardness: Measurement was performed using the M scale in accordance with ISO 2039-2.

Formability

Lens cracking: "Lens cracking" is a phenomenon in which the lens cracks during polymerization. Five lenses of Plano 4C (2 mm thick) were created, and a case where one or more cracked after polymerization was classified as "cracked lens" (productivity failure), and a case in which no lenses cracked was classified as "no lens cracking" (good productivity).

Polymeric peeling: "Polymeric peeling" is a phenomenon in which the molded product is peeled off from the glass mold during polymerization in a glass mold. A molded product which did not peel off during polymerization was evaluated as "A", a molded product which was peeled off during polymerization but for which a circular pattern was not confirmed was evaluated as "B", and a molded product which was peeled during polymerization, and for which a circular pattern was confirmed was evaluated as "x". The circular pattern means a phenomenon in which an unpolymerized portion is formed, for example, due to peeling of the molded product from the glass mold during polymerization, and appears primarily as a circular pattern on the lens surface.

Striae: "Striae" area phenomenon in which the refractive index is locally different from the surrounding normal refractive index due to a difference in composition, and are observed as stripe shapes. The created sample was used in projection with a high-pressure mercury lamp (light source model OPM-252 HEG: manufactured by Ushio Inc.), and the transmitted image was visually observed for the presence or absence of striae. A sample in which no striped shape was observed was evaluated as A, and a sample in which a striped shape was observed was evaluated as x.

Release cracking: Five lenses of Plano 4C (2 mm thick) were created, and when separating the mold and the lens after completion of the polymerization, a case in which no lenses were cracked was evaluated as "A", a case in which one or more lenses were cracked was evaluated as "B", and a case in which four or more lenses were cracked was evaluated as "x".

Transmittance during coloring: The transmittance at 550 nm was measured after irradiation of a molded product processed to a thickness of 2 mm for 15 minutes using an Ushio Electric MS-35 AAF/FB xenon lamp light source apparatus (illuminance 50,000 lux) at 23° C. The smaller the transmittance, the higher the light shielding property at during coloring.

Fading rate: In the same manner as the transmittance measurement during coloring, after irradiating the molded product with light for 15 minutes, the light irradiation was stopped and then the time required for the absorbance at 550 nm of the molded product sample to recover to an intermediate value of the absorbance before and after coloring was measured. This time was taken as the fading rate. A molded product having low transmittance during coloring and a fast fading rate is judged to have a good photochromic property.

(Raw Materials Used)

Allyl Carbonate Compound (A)

RAV 7AT (Poly(allyl carbonate) compound of diethylene glycol and pentaerythritol and oligomers thereof, manufactured by ACOMON)

RAV 7NG (Poly(allyl carbonate) compound of diethylene glycol and pentaerythritol and oligomers thereof, manufactured by ACOMON)

(meth)Acrylate Compound (B)

Diethylene glycol dimethacrylate (NK ester 2G, manufactured by Shin-Nakamura Chemical Co., Ltd.)

Triethylene glycol dimethacrylate (NK ester 3G, manufactured by Shin-Nakamura Chemical Co., Ltd.)

Photochromic Compound (C)

Reversacol Heath Green (polyoxyalkylene chain, naphthopyran type chromophore (General Formula (c)))

Reversacol Wembley Grey (polyoxyalkylene chain, naphthopyran type chromophore (General Formula (c)))

Reversacol Wilson Blue (polyoxyalkylene chain, naphthopyran type chromophore (General Formula (c)))

Reversacol Cayenne Red (polyoxyalkylene chain, naphthopyran type chromophore (General Formula (c)))

Radical Polymerization Initiator (D)

D11: t-butyl-peroxyneodecanoate (Perbutyl ND, manufactured by NOF Corporation)

Radical residual ratio after 5 hours at 50° C.: 57.6%

Radical residual ratio after 5 hours at 70° C.: 0.2% D12: 1,1,3,3-tetramethylbutylperoxy-2-ethylhexanoate (Perocta O, manufactured by NOF Corporation)

Radical residual ratio after 5 hours at 70° C.: 53.8% D21: t-amylperoxy-2-ethylhexanoate (Trigonox 121, manufactured by Kayaku Akzo Corporation)

Radical residual ratio after 5 hours at 70° C.: 78.5% D22: 1,1-di(t-amylperoxy) cyclohexane (Luperox 531, manufactured by Arkema)

Radical residual ratio after 5 hours at 70° C.: 98.6%

Example 1

Into 14.0 parts by weight of polyallyl carbonate RAV 7NG (manufactured by Acomon), 66.0 parts by weight of diethylene glycol dimethacrylate NK ester 2G (manufactured by Shin-Nakamura Chemical Co., Ltd.), and 20.0 parts by weight of triethylene glycol dimethacrylate NK ester 3G (manufactured by Shin-Nakamura Chemical Co., Ltd.), 0.0215 parts by weight of Reversacol Heath Green and 0.054 parts by weight of Reversacol Wembley Grey were added as a photochromic compound, 2.0 parts by weight of t-butylperoxyneodecanoate and 0.2 parts by weight of 1,1-di(t-amylperoxy) cyclohexane were added as a catalyst, and the mixture was stirred and dissolved. Degassing was carried out under 5 mmHg for 60 minutes. Filtration was performed with a 1 μm PTFE filter and the result was injected into a mold comprised of glass mold and tape. After placing the mold into an oven, polymerization was carried out by gradually raising the temperature from 35° C. to 95° C. over 24 hours. After completion of the polymerization, the mold was taken out from the oven and the result was released from the mold to obtain a 2.0 mm thick flat resin plate. The evaluation results of the formability are shown in Table 1. The obtained flat resin plate was further annealed at 100° C. for 1 hour. The obtained flat resin plate had a refractive index (ne) of 1.51 and an Abbe number (ve) of 56. The obtained molded product was colorless and transparent. It was confirmed that a good hardness was exhibited with the Rockwell hardness being 96. In addition, it was confirmed that the photochromic property was excellent with the transmittance during coloring being 16% and the fading rate being 71 s. The obtained results are shown in Table 1.

Examples 2 to 6, Comparative Examples 1 to 4

As shown in Table 1, polymerization was performed in the same manner as in Example 1 to obtain molded products except that the kind and addition amount of each monomer were changed. The obtained results are shown in Table 1.

Example 7

Into 12.0 parts by weight of polyallyl carbonate RAV 7AT (manufactured by Acomon), 88.0 parts by weight of triethylene glycol dimethacrylate NK ester 3G (manufactured by Shin-Nakamura Chemical Co., Ltd.), and 2.0 parts by weight of an α-methylstyrene dimer, 0.0285 parts by weight of Reversacol Heath Green and 0.053 parts by weight of Reversacol Wembley Grey were added as a photochromic compound, and 0.5 parts by weight of t-butylperoxyneodecanoate and 0.2 parts by weight of 1,1-di(t-amylperoxy) cyclohexane were added as a catalyst, and the mixture was stirred and dissolved. Degassing was carried out under 5 mm Hg for 60 minutes. Filtration was performed with a 1 μm PTFE filter and the result was injected into a mold comprised of a glass mold and tape. After placing the mold into the oven, polymerization was carried out by gradually raising the temperature from 35° C. to 95° C. over 24 hours. After completion of the polymerization, the mold was taken out from the oven and the result was released from the mold to obtain a 2.0 mm thick flat resin plate. The evaluation results of the formability are shown in Table 1. The obtained flat resin plate was further annealed at 110° C. for 1 hour. The obtained flat resin plate had a refractive index (ne) of 1.51 and an Abbe number (ve) of 54. The obtained molded product was colorless and transparent. It was confirmed that a good hardness was exhibited with the Rockwell hardness being 82. In addition, it was confirmed that the photochromic property was excellent with the transmittance during coloring being 17% and the fading rate being 54 s. The obtained results are shown in Table 1.

Example 8

Into 4.0 parts by weight of polyallyl carbonate RAV 7AT (manufactured by Acomon), 96.0 parts by weight of triethylene glycol dimethacrylate NK ester 3G (manufactured by Shin-Nakamura Chemical Co., Ltd.), and 2.0 parts by weight of α-methylstyrene dimer, 0.0285 parts by weight of Reversacol Heath Green and 0.053 parts by weight of Reversacol Wembley Grey were added as a photochromic compound, and 0.55 parts by weight of t-butylperoxyneodecanoate, and 0.15 parts by weight of 1,1,3,3-tetramethylbutyl 2-ethylperoxyhexanoate were added as a catalyst, and the mixture was stirred and dissolved. Degassing was carried out under 5 mm Hg for 60 minutes. Filtration was performed with a 1 μm PTFE filter and the result was injected into a mold comprised of glass mold and tape. After placing the mold into the oven, polymerization was carried out by gradually raising the temperature from 35° C. to 95° C. over 24 hours. After completion of the polymerization, the mold was taken out from the oven and the result was released from the mold to obtain a 2.0 mm thick flat resin plate. The evaluation results of the formability are shown in Table 1. The obtained flat resin plate was further annealed at 110° C. for 1 hour. The obtained flat resin plate had a refractive index (ne) of 1.50 and an Abbe number (ve) of 56. The obtained molded product was colorless and transparent. It was confirmed that a good hardness was exhibited with the Rockwell hardness being 96. In addition, it was confirmed that the photochromic property was excellent with the transmittance during coloring being 18% and the fading rate being 112 s. The obtained results are shown in Table 1.

Example 9

Into 12.0 parts by weight of polyallyl carbonate RAV 7AT (manufactured by Acomon), 88.0 parts by weight of triethylene glycol dimethacrylate NK ester 3G (manufactured by Shin-Nakamura Chemical Co., Ltd.), and 2.0 parts by weight of α-methylstyrene dimer, 0.0323 parts by weight of Reversacol Heath Green and 0.081 parts by weight of Reversacol Wembley Grey were added as a photochromic compound, and 0.5 parts by weight of t-butylperoxyneodecanoate and 0.2 parts by weight of 1,1,3,3-tetramethylbutyl 2-ethylperoxyhexanoate were added as a catalyst, and the mixture was stirred and dissolved. Degassing was carried out under 5 mm Hg for 60 minutes. Filtration was performed with a 1 μm PTFE filter and the result was injected into a mold comprised of glass mold and tape. After placing the mold into the oven, polymerization was carried out by gradually raising the temperature from 35° C. to 95° C. over 24 hours. After completion of the polymerization, the mold was taken out from the oven and the result was released from the mold to obtain a 2.0 mm thick flat resin plate. The evaluation results of the formability are shown in Table 1. The obtained flat resin plate was further annealed at 110° C. for 1 hour. The obtained flat resin plate had a refractive index (ne) of 1.51 and an Abbe number (ve) of 53. The obtained molded product was colorless and transparent. It was confirmed that a good hardness was exhibited with the Rockwell hardness being 82. In addition, it was confirmed that the photochromic property was excellent with the transmittance during coloring being 16% and the fading rate being 52 s. The obtained results are shown in Table 1.

Example 10

Into 12.0 parts by weight of polyallyl carbonate RAV 7AT (manufactured by Acomon), 88.0 parts by weight of triethylene glycol dimethacrylate NK ester 3G (manufactured by Shin-Nakamura Chemical Co., Ltd.), and 2.0 parts by weight of α-methylstyrene dimer, 0.0323 parts by weight of Reversacol Heath Green and 0.081 parts by weight of Reversacol Wilson Blue were added as a photochromic compound, and 0.55 parts by weight of t-butylperoxyneodecanoate and 0.15 parts by weight of 1,1,3,3-tetramethylbutyl 2-ethylperoxyhexanoate were added as a catalyst, and the mixture was stirred and dissolved. Degassing was carried out under 5 mm Hg for 60 minutes. Filtration was performed with a 1 μm PTFE filter and the result was injected into a mold comprised of glass mold and tape. After placing the mold into the oven, polymerization was carried out by gradually raising the temperature from 35° C. to 95° C. over 24 hours. After completion of the polymerization, the mold was taken out from the oven and the result was released from the mold to obtain a 2.0 mm thick flat resin plate. The evaluation results of the formability are shown in Table 1. The obtained flat resin plate was further annealed at 110° C. for 1 hour. The obtained flat resin plate had a refractive index (ne) of 1.51 and an Abbe number (ve) of 54. The obtained molded product was colorless and transparent. It was confirmed that a good hardness was exhibited with the Rockwell hardness being 82. In addition, it was confirmed that the photochromic property was excellent with the transmittance during coloring being 16% and the fading rate being 65 s. The obtained results are shown in Table 1.

Example 11

Into 12.0 parts by weight of polyallyl carbonate RAV 7AT (manufactured by Acomon), 88.0 parts by weight of triethylene glycol dimethacrylate NK ester 3G (manufactured by Shin-Nakamura Chemical Co., Ltd.), and 2.0 parts by weight of α-methylstyrene dimer, 0.18 parts by weight of Reversacol Heath Green and 0.080 parts by weight of Reversacol Cayenne Red were added as a photochromic compound, and 0.55 parts by weight of t-butylperoxyneodecanoate and 0.15 parts by weight of 1,1,3,3-tetramethylbutyl-2-ethylperoxyhexanoate were added as a catalyst, and the mixture was stirred and dissolved. Degassing was carried out under 5 mm Hg for 60 minutes. Filtration was performed with a 1 μm PTFE filter and the result was injected into a mold comprised of glass mold and tape. After placing the mold into the oven, polymerization was carried out by gradually raising the temperature from 35° C. to 95° C. over 24 hours. After completion of the polymerization, the mold was taken out from the oven and the result was released from the mold to obtain a 2.0 mm thick flat resin plate. The evaluation results of the formability are shown in Table 1. The obtained flat resin plate was further annealed at 110° C. for 1 hour. The obtained flat resin plate had a refractive index (ne) of 1.51 and an Abbe number (ve) of 54. The obtained molded product was colorless and transparent. It was confirmed that a good hardness was exhibited with the Rockwell hardness being 82. In addition, it was confirmed that the photochromic property was excellent with the transmittance during coloring being 18% and the fading rate being 61 s. The obtained results are shown in Table 1.

Example 12

Into 29.0 parts by weight of polyallyl carbonate RAV 7AT (manufactured by Acomon), 71.0 parts by weight of triethylene glycol dimethacrylate NK ester 3G (manufactured by Shin-Nakamura Chemical Co., Ltd.), and 2.0 parts by weight of α-methylstyrene dimer, 0.0285 parts by weight of Reversacol Heath Green and 0.053 parts by weight of Reversacol Wembley Grey were added as a photochromic compound, and 0.55 parts by weight of t-butylperoxyneodecanoate and 0.15 parts by weight of 1,1,3,3-tetramethylbutyl 2-ethylperoxyhexanoate were added as a catalyst, and the mixture was stirred and dissolved. Degassing was carried out under 5 mm Hg for 60 minutes. Filtration was performed with a 1 μm PTFE filter and the result was injected into a mold comprised of glass mold and tape. After placing the mold into the oven, polymerization was carried out by gradually raising the temperature from 35° C. to 95° C. over 24 hours. After completion of the polymerization, the mold was taken out from the oven and the result was released from the mold to obtain a 2.0 mm thick flat resin plate. The evaluation results of the formability are shown in Table 1. The obtained flat resin plate was further annealed at 110° C. for 1 hour. The obtained flat resin plate had a refractive index (ne) of 1.51 and an Abbe number (ve) of 55. The obtained molded product was colorless and transparent. It was confirmed that a good hardness was exhibited with the Rockwell hardness being 78. In addition, it was confirmed that the photochromic property was excellent with the transmittance during coloring being 19% and the fading rate being 46 s. The obtained results are shown in Table 1.

Example 13

Into 12.0 parts by weight of polyallyl carbonate RAV 7AT (manufactured by Acomon), 88.0 parts by weight of triethylene glycol dimethacrylate NK ester 3G (manufactured by Shin-Nakamura Chemical Co., Ltd.), and 2.0 parts by weight of α-methylstyrene dimer, 0.0285 parts by weight of Reversacol Heath Green and 0.053 parts by weight of Reversacol Wembley Grey were added as a photochromic compound, and 0.55 parts by weight of t-butylperoxyneodecanoate and 0.13 parts by weight of t-amyl peroxy-2-ethylhexanoate were added as a catalyst, and the mixture was stirred and dissolved. Degassing was carried out under 5 mm Hg for 60 minutes. Filtration was performed with a 1 μm PTFE filter and the result was injected into a mold comprised of glass mold and tape. After placing the mold into the oven, polymerization was carried out by gradually raising the temperature from 35° C. to 95° C. over 24 hours. After completion of the polymerization, the mold was taken out from the oven and the result was released from the mold to obtain a 2.0 mm thick flat resin plate. The evaluation results of the formability are shown in Table 1. The obtained flat resin plate was further annealed at 110° C. for 1 hour. The obtained flat resin plate had a refractive index (ne) of 1.51 and an Abbe number (ve) of 54. The obtained molded product was colorless and transparent. It was confirmed that a good hardness was exhibited with the Rockwell hardness being 82. In addition, it was confirmed that the photochromic property was excellent with the transmittance during coloring being 17% and the fading rate being 53 s. The obtained results are shown in Table 1.

Example 14

Into 12.0 parts by weight of polyallyl carbonate RAV 7AT (manufactured by Acomon), 68.0 parts by weight of diethylene glycol dimethacrylate NK ester 2G (manufactured by Shin-Nakamura Chemical Co., Ltd.), 20.0 parts by weight of triethylene glycol dimethacrylate NK ester 3G (manufactured by Shin-Nakamura Chemical Co., Ltd.), and 2.0 parts by weight of α-methylstyrene dimer, 0.0323 parts by weight of Reversacol Heath Green and 0.081 parts by weight of Reversacol Wembley Grey were added as a photochromic compound, and 0.55 parts by weight of t-butylperoxyneodecanoate and 0.13 parts by weight of 1,1,3,3-tetramethylbutyl 2-ethylperoxyhexanoate were added as a catalyst, and the mixture was stirred and dissolved. Degassing was carried out under 5 mm Hg for 60 minutes. Filtration was performed with a 1 μm PTFE filter and the result was injected into a mold comprised of glass mold and tape. After placing the mold into the oven, polymerization was carried out by gradually raising the temperature from 35° C. to 95° C. over 24 hours. After completion of the polymerization, the mold was taken out from the oven and the result was released from the mold to obtain a 2.0 mm thick flat resin plate. The evaluation results of the formability are shown in Table 1. The obtained flat resin plate was further annealed at 110° C. for 1 hour. The obtained flat resin plate had a refractive index (ne) of 1.51 and an Abbe number (ve) of 56. The obtained molded product was colorless and transparent. It was confirmed that a good hardness was exhibited with the Rockwell hardness being 102. In addition, it was confirmed that the photochromic property was excellent with the transmittance during coloring being 16% and the fading rate being 55 s. The obtained results are shown in Table 1.

Example 15

Into 12.0 parts by weight of polyallyl carbonate RAV 7AT (manufactured by Acomon), 88.0 parts by weight of triethylene glycol dimethacrylate NK ester 3G (manufactured by Shin-Nakamura Chemical Co., Ltd.), and 2.0 parts by weight of α-methylstyrene dimer, 0.10 parts by weight of dimethyl (p-methoxybenzylidene) malonate (Hostavin PR-25 (product name), manufactured by Clariant) were added as an ultraviolet absorber, 0.0323 parts by weight of Reversacol Heath Green and 0.081 parts by weight of Reversacol Wembley Grey were added as a photochromic compound, and 0.55 parts by weight of t-butylperoxyneodecanoate and 0.15 parts by weight of 1,1,3,3-tetramethylbutyl 2-ethylperoxyhexanoate were added as a catalyst, and the mixture was stirred and dissolved. Degassing was carried out under 5 mm Hg for 60 minutes. Filtration was performed with a 1 μm PTFE filter and the result was injected into a mold comprised of glass mold and tape. After placing the mold into the oven, polymerization was carried out by gradually raising the temperature from 35° C. to 95° C. over 24 hours. After completion of the polymerization, the mold was taken out from the oven and the result was released from the mold to obtain a 2.0 mm thick flat resin plate. The evaluation results of the formability are shown in Table 1. The obtained flat resin plate was further annealed at 110° C. for 1 hour. The obtained flat resin plate had a refractive index (ne) of 1.51 and an Abbe number (ve) of 54. The obtained molded product was colorless and transparent. It was confirmed that a good hardness was exhibited with the Rockwell hardness being 82. In addition, it was confirmed that the photochromic property was excellent with the transmittance during coloring being 16% and the fading rate being 52 s. The obtained results are shown in Table 1.

TABLE 1

| | Composition | | | Formability | | | |
|---|---|---|---|---|---|---|---|
| | Component A (parts by weight) | Component B (parts by weight) | Component C (parts by weight) | Component D | Lens cracking | Polymeric peeling | Striae | Release cracking |
| Example 1 | RAV 7NG(14) | 2G(66) 3G(20) | Green(0.0215) Grey(0.054) | D11 D22 | Absent | B | A | B |
| Example 2 | RAV 7NG(20) | 2G(60) 3G(20) | Green(0.0215) Grey(0.054) | D11 D22 | Absent | B | A | A |
| Example 3 | RAV 7NG(20) | 2G(80) | Green(0.0215) Grey(0.054) | D11 D22 | Absent | B | A | A |
| Example 4 | RAV 7AT(8) | 2G(72) 3G(20) | Green(0.0215) Grey(0.054) | D11 D22 | Absent | B | A | B |
| Example 5 | RAV 7AT(12) | 2G(68) 3G(20) | Green(0.0215) Grey(0.054) | D11 D22 | Absent | B | A | B |
| Example 6 | RAV 7AT(14) | 2G(66) 3G(20) | Green(0.0215) Grey(0.054) | D11 D22 | Absent | B | A | B |
| Example 7 | RAV 7AT(12) | 3G(88) | Green(0.0285) Grey(0.053) | D11 D22 | Absent | B | A | A |
| Example 8 | RAV 7AT(4) | 3G(96) | Green(0.0285) Grey(0.053) | D11 D12 | Absent | B | A | B |
| Example 9 | RAV 7AT(12) | 3G(88) | Green(0.0323) Grey(0.081) | D11 D12 | Absent | A | A | A |
| Example 10 | RAV 7AT(12) | 3G(88) | Green(0.0323) Blue(0.081) | D11 D12 | Absent | A | A | A |
| Example 11 | RAV 7AT(12) | 3G(88) | Green(0.18) Red(0.080) | D11 D12 | Absent | A | A | A |
| Example 12 | RAV 7AT(29) | 3G(71) | Green(0.0285) Grey(0.053) | D11 D12 | Absent | A | A | A |
| Example 13 | RAV 7AT(12) | 3G(88) | Green(0.0285) Grey(0.053) | D11 D21 | Absent | A | A | A |

TABLE 1-continued

| | | | | | | | | |
|---|---|---|---|---|---|---|---|---|
| Example 14 | RAV 7AT(12) | 2G(68) 3G(20) | Green(0.0323) Grey(0.081) | D11 D12 | Absent | A | A | B |
| Example 15 | RAV 7AT(12) | 3G(88) | Green(0.0323) Grey(0.081) | D11 D12 | Absent | A | A | A |
| Comparative Example 1 | RAV 7NG(100) | — | Green(0.0215) Grey(0.054) | D11 | Absent | B | A | A |
| Comparative Example 2 | — | 2G(100) | Green(0.0215) Grey(0.054) | D11 | Present | x | A | B |
| Comparative Example 3 | — | 3G(100) | Green(0.0215) Grey(0.054) | D11 | Present | x | A | B |
| Comparative Example 4 | RAV 7NG(35) | 3G(65) | Green(0.0215) Grey(0.054) | D11 | Absent | B | A | A |

| | Resin Characteristics | | | | Light Adjusting Performance | |
|---|---|---|---|---|---|---|
| | Refractive index | Abbe number | Transparency | Rockwell hardness | Transparency during coloring (%) | Fading rate (s) |
| Example 1 | 1.51 | 56 | Good | 96 | 16 | 71 |
| Example 2 | 1.51 | 56 | Good | 84 | 16 | 52 |
| Example 3 | 1.51 | 55 | Good | 81 | 17 | 65 |
| Example 4 | 1.51 | 55 | Good | 90 | 18 | 80 |
| Example 5 | 1.51 | 56 | Good | 91 | 19 | 79 |
| Example 6 | 1.51 | 56 | Good | 92 | 18 | 57 |
| Example 7 | 1.51 | 54 | Good | 82 | 17 | 54 |
| Example 8 | 1.50 | 56 | Good | 96 | 18 | 112 |
| Example 9 | 1.51 | 53 | Good | 82 | 16 | 52 |
| Example 10 | 1.51 | 54 | Good | 82 | 16 | 65 |
| Example 11 | 1.51 | 54 | Good | 82 | 18 | 61 |
| Example 12 | 1.51 | 55 | Good | 78 | 19 | 46 |
| Example 13 | 1.51 | 54 | Good | 82 | 17 | 53 |
| Example 14 | 1.51 | 56 | Good | 102 | 16 | 55 |
| Example 15 | 1.51 | 54 | Good | 82 | 16 | 52 |
| Comparative Example 1 | 1.50 | 58 | Good | 63 | 26 | 121 |
| Comparative Example 2 | 1.51 | 54 | Good | 105 | 21 | 164 |
| Comparative Example 3 | 1.51 | 54 | Good | 102 | 20 | 168 |
| Comparative Example 4 | — | — | Poor | — | — | — |

As is clear from the results of Comparative Examples 1 to 3 and Examples, it was confirmed that, by copolymerizing the A component and the B component at a specific mixing ratio, a molded product has a good photochromic property in which the transmittance during coloring is lowered and the fading rate is also fast is obtained. In addition, at the same time, it was also confirmed that the Rockwell hardness was sufficient and the formability was excellent. It was confirmed that the molded product obtained from the polymerizable composition for an optical material including 35% by weight of the component A and 65% by weight of the component B was cloudy, as in Comparative Example 4.

This application is claims priority based on Japanese Laid-open Patent Publication No. 2016-194497 filed on Sep. 30, 2016, Japanese Laid-open Patent Publication No. 2017-029044 filed on Feb. 20, 2017, and Japanese Laid-open Patent Publication No. 2017-137029, filed on Jul. 13, 2017, the entire disclosures of which are hereby incorporated by reference.

The invention claimed is:
1. A polymerizable composition for an optical material comprising:
(A) an allyl carbonate compound represented by General Formula (1) and including two or more allyloxycarbonyl groups;
(B) a (meth)acrylate compound represented by General Formula (2) and including two or more (meth)acryl groups; and
(C) a photochromic compound;
wherein, in 100% by weight in a total of the compound (A) and the compound (B), the compound (A) is included in an amount of more than 0% by weight and 30% by weight or less and the compound (B) is included in an amount of 70% by weight or more and less than 100% by weight,

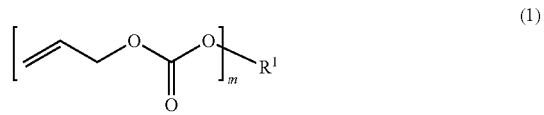

(1)

wherein, $R^1$ indicates a divalent to 20 valent group derived from a linear or branched aliphatic polyol having 3 to 35 carbon atoms which optionally include a hetero atom or a divalent to 20 valent group derived from a cycloaliphatic polyol having 5 to 40 carbon atoms which optionally include a hetero atom, m indicates an integer of 2 to 10, and $R^1$ does not include an allyloxycarbonyl group,

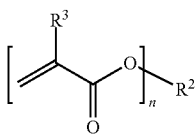

(2)

wherein, $R^2$ indicates a divalent to tetravalent organic group having 1 to 30 carbon atoms which optionally include a hetero atom or an aromatic group, $R^3$ indicates a hydrogen atom or a methyl group, and n indicates an integer of 2 to 4.

2. The polymerizable composition for an optical material according to claim 1,
wherein, in 100% by weight in the total of the compound (A) and the compound (B), the compound (A) is included in an amount of 5% by weight or more and 30% by weight or less and the compound (B) is included in an amount of 70% by weight or more and 95% by weight or less.

3. The polymerizable composition for an optical material according to claim 1, further comprising:
a radical polymerization initiator (D),
wherein the radical polymerization initiator (D) includes at least
a radical polymerization initiator (D1) having a radical residual ratio of 20% or more and less than 100% after 5 hours at 50° C. and a radical residual ratio of 0% or more and less than 30% after 5 hours at 70° C., and
a radical polymerization initiator (D2) having a radical residual ratio of 30% or more and less than 100% after 5 hours at 70° C.

4. The polymerizable composition for an optical material according to claim 1,
wherein the compound (A) is at least one kind selected from
a bis(allyl carbonate) compound of at least one kind of diol selected from diethylene glycol, dipropylene glycol, triethylene glycol, tetraethylene glycol, 1,3-propanediol, 1,4-butanediol, 1,5-pentanediol, 1,6-hexanediol, neopentyl glycol, 3-methyl-1,5-pentanediol, 2-methyl-2-ethyl-1,3-propanediol, 2,2-diethyl-1,3-propanediol, 2,2,4-trimethyl-1,3-pentanediol, 1,4-dimethylolcyclohexane, and 4,8-bis(hydroxymethyl)-[5.2.1.0$^{2,6}$]tricyclodecane,
a tris(allyl carbonate) compound of at least one kind of triol selected from glycerol, trimethylolpropane, and tris(hydroxyethyl) isocyanurate,
a tetra(allyl carbonate) compound of at least one kind of tetraol selected from pentaerythritol, diglycerol, and ditrimethylol propane,
a dipentaerythritol hexa(allyl carbonate) compound, and
a mixed poly(allyl carbonate) compound of at least two kinds of compounds selected from the diols, the triols, the tetraols, and the dipentaerythritol.

5. The polymerizable composition for an optical material according to claim 1,
wherein the compound (A) is at least one kind selected from
(i) a mixture of a diethylene glycol bis(allyl carbonate) compound and an oligomer thereof,
(ii) a mixture of a bis(allyl carbonate) compound of a mixture of diethylene glycol and neopentyl glycol and an oligomer thereof,
(iii) a mixture of a poly(allyl carbonate) compound of a mixture of diethylene glycol and tris(hydroxyethyl) isocyanurate and an oligomer thereof,
(iv) a mixture of a poly(allyl carbonate) compound of a mixture of diethylene glycol and trimethylolpropane and an oligomer thereof,
(v) a mixture of a poly(allyl carbonate) compound of a mixture of diethylene glycol and pentaerythritol and an oligomer thereof,
(vi) a mixture of a poly(allyl carbonate) compound of a mixture of diethylene glycol, neopentyl glycol and pentaerythritol and an oligomer thereof, and
(vii) a poly(allyl carbonate) mixture comprising a mixture of a poly(allyl carbonate) compound of a mixture of diethylene glycol, neopentyl glycol, and pentaerythritol and an oligomer thereof, and a mixture of a diethylene glycol bis(allyl carbonate) compound and an oligomer thereof.

6. The polymerizable composition for an optical material according to claim 1,
wherein the compound (B) is selected from compounds represented by General Formula (2-1) and General Formula (2-2);

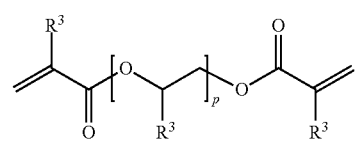

(2-1)

wherein, p indicates a numerical value of 1 to 100, $R^3$ indicates a hydrogen atom or a methyl group, and may not be the same as each other,

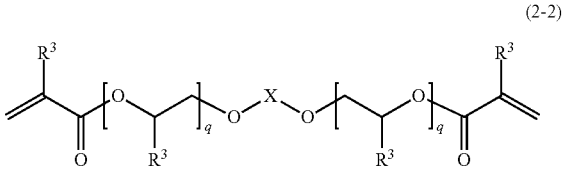

(2-2)

wherein, q indicates a numerical value of 1 or more and a total of two q's indicates a numerical value of 2 to 100, $R^3$'s indicate a hydrogen atom or a methyl group and may not be the same as each other, X indicates a substituted or unsubstituted divalent aromatic group or a substituted or unsubstituted divalent aliphatic group which optionally include an aromatic group having 1 to 20 carbon atoms.

7. The polymerizable composition for an optical material according to claim 6,
wherein the compound (B) is selected from the compounds represented by General Formula (2-1) in which p is 2 to 4.

8. The polymerizable composition for an optical material according to claim 7,
wherein the compound (B) is at least one kind selected from diethylene glycol dimethacrylate, triethylene glycol dimethacrylate, diethylene glycol diacrylate, and triethylene glycol diacrylate.

9. The polymerizable composition for an optical material according to claim 1, wherein the compound (C) is represented by General Formula (5);

$$(5)$$

[Chemical structure showing a naphthopyran ring system with R₁, R₂ on the pyran carbon, O in the ring, (R₃)ₘ on the benzo ring, and ring A annelated]

wherein, in the formula, R₁ and R₂ may be the same or different and independently represent
hydrogen;
a linear or branched alkyl group having 1 to 12 carbon atoms;
a cycloalkyl group having 3 to 12 carbon atoms;
a substituted or unsubstituted aryl group having 6 to 24 carbon atoms or heteroaryl group having 4 to 24 carbon atoms wherein as the substituent, there is at least one substituent selected from a halogen atom, a hydroxyl group, a linear or branched alkyl group having 1 to 12 carbon atoms, a linear or branched alkoxy group having 1 to 12 carbon atoms, a linear or branched haloalkyl group having 1 to 12 carbon atoms substituted with at least one halogen atom, a linear or branched haloalkoxy group having 1 to 12 carbon atoms substituted with at least one halogen atom, a phenoxy group or naphthoxy group substituted with at least one linear or branched alkyl group or alkoxy group having 1 to 12 carbon atoms, a linear or branched alkenyl group having 2 to 12 carbon atoms, an —NH₂ group, an —NHR group, and an —N(R)₂ group wherein R is a linear or branched alkyl group having 1 to 6 carbon atoms, and when two R's are present, two R's may be the same or different, and a methacryloyl group and an acryloyl group; or
a linear or branched alkyl group having 1 to 4 carbon atoms and substituted with an aryl group or heteroaryl group,
R³ may be the same or different and independently represent
a halogen atom;
a linear or branched alkyl group having 1 to 12 carbon atoms;
a cycloalkyl group having 3 to 12 carbon atoms;
a linear or branched alkoxy group having 1 to 12 carbon atoms;
a linear or branched haloalkyl group having 1 to 12 carbon atoms substituted with at least one halogen atom, a halocycloalkyl group having 3 to 12 carbon atoms substituted with at least one halogen atom, and a linear or branched haloalkoxy group having 1 to 12 carbon atoms substituted with at least one halogen atom;
a substituted or unsubstituted aryl group having 6 to 24 carbon atoms or heteroaryl group having 4 to 24 carbon atoms wherein as the substituent, there is at least one substituent selected from a halogen atom, a hydroxyl group, a linear or branched alkyl group having 1 to 12 carbon atoms, a linear or branched alkoxy group having 1 to 12 carbon atoms, a linear or branched haloalkyl group having 1 to 12 carbon atoms substituted with at least one halogen atom, a linear or branched haloalkoxy group having 1 to 12 carbon atoms substituted with at least one halogen atom, a phenoxy group or naphthoxy group substituted with at least one linear or branched alkyl group or alkoxy group having 1 to 12 carbon atoms, a linear or branched alkenyl group having 2 to 12 carbon atoms, and an amino group;
a linear or branched alkyl group having 1 to 4 carbon atoms and substituted with an aryl group or heteroaryl group;
a substituted or unsubstituted phenoxy or naphthoxy group wherein as a substituent, there is at least one substituent selected from a linear or branched alkyl group or alkoxy group having 1 to 6 carbon atoms;
—NH₂, —NRR, —CONH₂, or —CONHR wherein R is a linear or branched alkyl group having 1 to 6 carbon atoms; or
—OCOR₈ or —COOR₈ wherein R₈ is a linear or branched alkyl group having 1 to 6 carbon atoms or a cycloalkyl group having 3 to 6 carbon atoms, or in R₁ and R₂, a phenyl group substituted with at least one substituent of a substituted aryl or substituted heteroaryl group or an unsubstituted phenyl group,
m is an integer of 0 to 4,
A represents an annelated ring of Formula (A2) or Formula (A4), $$(A_2)$$

[Cyclohexane ring with (R₄)ₙ substituent, dotted line indicating fusion]

$$(A_4)$$

[Tetrahydronaphthalene-type annelated ring with (R₄)ₙ and (R₅)ₚ substituents]

in these annelated rings,
a dotted line represents a carbon C5 carbon and C6 bond of a naphthopyran ring of General Formula (5),
an α bond of the annelated ring (A4) is able to be bonded to carbon C₅ or carbon C₆ of the naphthopyran ring of General Formula (5),
R₄'s are the same or different and independently represent OH, a linear or branched alkyl group or alkoxy group having 1 to 6 carbon atoms, or two R₄'s form carbonyl (CO),
R₅ is
halogen;
a linear or branched alkyl group having 1 to 12 carbon atoms;
a linear or branched haloalkyl group having 1 to 6 carbon atoms substituted with at least one halogen atom;
a cycloalkyl group having 3 to 12 carbon atoms;
a linear or branched alkoxy group having 1 to 6 carbon atoms;
a substituted or unsubstituted phenyl or benzyl group wherein as a substituent, when the R₁ and R₂ groups of General Formula (5) independently correspond to an aryl or heteroaryl group, there is at least one of the substituents described above in the definitions of the R₁ and R₂ groups;
—NH₂, —NHR wherein R is a linear or branched alkyl group having 1 to 6 carbon atoms;

a substituted or unsubstituted phenoxy or naphthoxy group wherein as a substituent, there is a linear or branched alkyl group or alkoxy group having at least 1 to 6 carbon atoms; or —$COR_9$, —$COOR_9$, or a —$CONHR_9$ group wherein $R_9$ is a linear or branched alkyl group having 1 to 6 carbon atoms, a cycloalkyl group having 3 to 6 carbon atoms, or a substituted or unsubstituted phenyl or benzyl group wherein as a substituent, when the $R_1$ and $R_2$ groups of General Formula (5) independently correspond to an aryl or heteroaryl group, there is at least one substituent described above in the definitions of the $R_1$ and $R_2$ groups; and, when A indicates ($A_4$), n is an integer of 0 to 2, p is an integer of 0 to 4, and when A indicates ($A_2$), n is an integer of 0 to 2.

10. The polymerizable composition for an optical material according to claim 1, wherein the compound (C) is represented by General Formula (a) or General Formula (b);

PC-L-Chain                                     (a)

PC-L-Chain-L'-PC'                          (b)

wherein, PC and PC' indicate General Formulas (c) to (f), and PC and PC' may be the same or different,

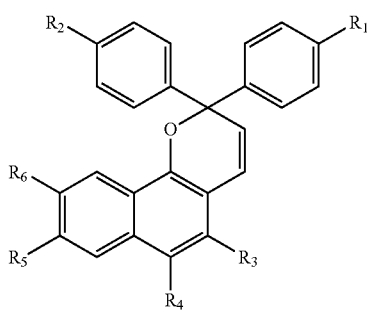
(c)

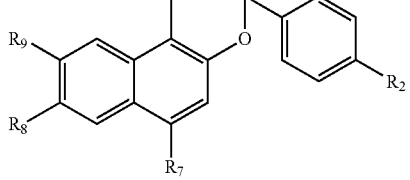
(d)

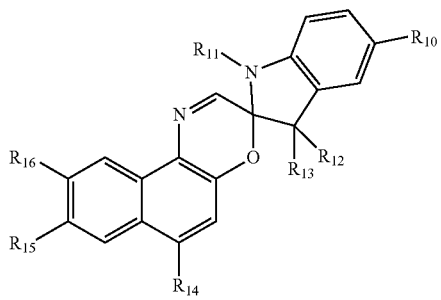
(e)

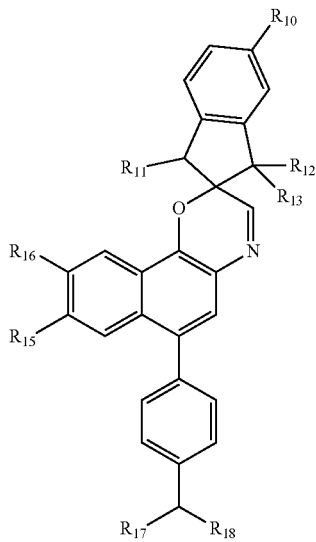
(f)

wherein, $R_1$ to $R_{18}$ indicate hydrogen, a halogen atom, a carboxyl group, an acetyl group, a formyl group, an aliphatic group having 1 to 20 carbon atoms which optionally be substituted, an alicyclic group having 3 to 20 carbon atoms which optionally be substituted, or an aromatic organic group having 6 to 20 carbon atoms which optionally be substituted, and may be the same as or different from each other, and these aliphatic, alicyclic, or aromatic organic groups may include an oxygen atom and a nitrogen atom, any one of the groups included in the compounds represented by General Formulas (c) to (f) is bonded to L or L' which is a divalent organic group, L and L' indicate a divalent organic group including one kind or more selected from an oxyethylene chain, an oxypropylene chain, a (thio) ester group, and a (thio)amide group, and Chain indicates a monovalent or divalent organic group including one kind or more selected from a polysiloxane chain and a polyoxyalkylene chain.

11. A molded product obtained by curing the polymerizable composition for an optical material according to claim 1.

12. An optical material comprised of the molded product according to claim 11.

13. A plastic lens comprised of the molded product according to claim 11.

14. A plastic polarizing lens comprising:
a polarizing film; and
a base material layer formed on a surface of at least an objective surface side of the polarizing film and comprised of the molded product according to claim 11.

* * * * *